(12) United States Patent
Wuytack et al.

(10) Patent No.: US 6,609,088 B1
(45) Date of Patent: Aug. 19, 2003

(54) METHOD FOR DETERMINING AN OPTIMIZED MEMORY ORGANIZATION OF A DIGITAL DEVICE

(75) Inventors: Sven Wuytack, Kessel-lo (BE); Francky Catthoor, Temse (BE); Hugo De Man, Leuven (BE); Jean-Philippe Diguet, Guer (FR)

(73) Assignee: Interuniversitaire Micro-Elektronica Centrum (BE)

( * ) Notice: Subject to any disclaimer, the term of this patent is extended or adjusted under 35 U.S.C. 154(b) by 0 days.

(21) Appl. No.: 09/360,042

(22) Filed: Jul. 23, 1999

Related U.S. Application Data

(60) Provisional application No. 60/094,124, filed on Jul. 24, 1998.

(51) Int. Cl.[7] .................................................. G06F 9/45
(52) U.S. Cl. ......................... 703/22; 703/21; 711/153; 711/165; 711/168; 711/117; 707/102
(58) Field of Search ............................... 382/236, 276; 707/102; 703/22, 2; 709/225; 710/60; 711/1, 3, 103, 119, 120, 141, 144, 165, 153, 168, 117, 170–173, 6; 712/34, 1, 28; 713/324

(56) References Cited

U.S. PATENT DOCUMENTS

| | | | | |
|---|---|---|---|---|
| 5,594,864 A | * | 1/1997 | Trauben ...................... | 714/39 |
| 5,664,193 A | * | 9/1997 | Tirumalai ................... | 717/153 |
| 5,742,814 A | * | 4/1998 | Balasa et al. ............... | 707/102 |
| 5,978,509 A | * | 11/1999 | Nachtergaele et al. ...... | 382/236 |
| 6,064,819 A | * | 5/2000 | Franssen et al. ............ | 717/156 |
| 6,078,745 A | * | 6/2000 | De Greef et al. ........... | 717/151 |

OTHER PUBLICATIONS

L. Nachtergale et al., "Optimization of memory organization and hierarchy for decreased size and power in video image processing systems", Proceedings International workshop on memory technology, Aug. 1995.*

S. Wuytack et al., "Power exploration for data domininated video applications", Proceedings, IEEE international Symposium on low power design, Aug. 1996.*

Al–Furiah et al., "Memory hierarchy management for iterative graph structures", Proceedings, IEEE international symposium on parallel and distributed processing, Mar.–Apr., 1998.*

Tien–Fu et al., "A hierarchical memory directory scheme via extending SCI for large scale multiprocessors", High performance computing on International superhighway, Apr.–May 1997.*

Yanbing Li et al., "A task_level Hierarchical memory model for system synthesis of multiprocessors", Proceedings, 34th Design Automation conference, Jun. 1997.*

Cathoor et al. "Global communication and memory optimizing tansformations for low power signal processing systems", IEEE workshop on VLSI signal processing, 1994.*

Franssen et al., "Control flow optimization for fast system simulation and storage minimization", European design and test conference, 1994.*

Danckaert et al., "System level memory optimization for hardware–software co–design", Proceedings of the Fifth International workshop on Hardware/Software codesign, 1997.*

(List continued on next page.)

*Primary Examiner*—Samuel Broda
*Assistant Examiner*—K Thangavelu
(74) *Attorney, Agent, or Firm*—Knobbe, Martens, Olson & Bear, LLP

(57) ABSTRACT

A formalized method for part of the design decisions, related to memory, involved while designing an essentially digital device is presented. The method shows how to traverse through and how to limit the search space being examined while solving these memory related design decisions. The method focuses on power consumption of said essentially digital device. A method for determining an optimized memory organization of an essentially digital device, wherein data reuse possibilities are explored, is described.

18 Claims, 12 Drawing Sheets

OTHER PUBLICATIONS

Cathoor et al., "system–level data–flow transformations for power reduction in image and video processing", Proceedings of the Third IEEE International conference on Electronics, circuits and systems, 1996.*

Moolenaar, et al., "System–level power exploration for MPEG–2 decoder on embedded cores: a systematic approah", 1997 IEEE workshop on Signal processing systems, 1997.*

Catthoor, "Power–efficient data storage and transfer methodologies: Current solutions and remaining problems", IEEE computer society workshop on VLSI System level design, 1998.*

Diguet et al., "Formalized methodology for data reuse exploration in hierarchical memory mappings," *International Symposium on Low Power Electronics and Design* (IEEE Cat. No. 97TH8332), pp. 30–35, Aug. 1997.

Greef et al., "Mapping real–time motion estimation type algorithms to memory effecient, programmable multi–processor architectures,"0 *Microprocessing and Microprogramming*, 41(5):409–423, Oct. 1995.

L. Nachtergaele, F. Catthoor, B. Kapoor, D. Moolenaar, S. Janssen, "Low Power Storage Exploration For H.263 Video Decoder, IEEE Workshop On VLSI Signal Processing", Monterey, CA, Oct. 1996. pps. 114–124.

S. Wuytack F. Catthoor, L. Nachtergaele, H. De Man, "Power Exploration For Data Dominated Video Applications, Proceedings IEEE International Symposium On Low Power Design", Monterey, pp. 359–364, Aug. 1996.

J. Fang, M. Lu, "An Iteration Partition Approach For Cache Or Local Memory Thrashing On Parallel Processing", IEEE Transactions on Computers, vol. C–42, No. 5, pp. 529–546, May 1993.

L. Nachtergaele, F. Catthoor, F. Balasa, F. Franssen, E. De Greef, H. Samsom, H. De Man, "Optimization Of Memory Organization And Hierarchy For Decreased Size And Power in Video and Image Processing Systems", Proceedings International Workshop on Memory Technology, Design and Testing, San Jose, CA, pp. 82–87, Aug. 1995.

P. Slock, S. Wuytack, F. Cathoor, G. de Jong, "Fast And Extensive System–Level Memory Exploration For ATM Applications", Accepted for Proceedings $10^{th}$ ACM/IEEE International Symposium on System–Level Synthesis, Antwerp, Belgium, Sep. 1997, pps. 74–81.

E. De Greef, F. Catthoor, H. De Man, "Memory Size Reduction Through Storage Order Optimization For Embedded Parallel Multimedia Applications", International Parallel Processing Symposium (IPPS) in Proceedings Workshop on Parallel Processing and Multimedia Geneva, Switzerland, pp. 84–98, Apr. 1997.

* cited by examiner

```
for...
  for....
  {
    ... = f1(A[][]);
  }
```

*FIG. 7B*

```
for...
  for....
  {
    ... = f1(([][]);
    ... = f2(A[][]);
  }
```

*FIG. 7C*

```
for...
  for....
  {
    ... = f1(A[][]);
  }
for...
  for....
  {
    ... = f2(A[][]);
  }
```

*FIG. 7D*

```
for (g=0; g<H/n; g++)           /* vertical CB counter */
    for (h=0; h<W/n; h++)       /* horizontal CB counter */
    {
    Δopt[g][h]=+ ∞;
        for (i=-m; i<m; i++)    /* vertical searching of RW */
            for(j=-m; j<m; j++) /* horizontal searching of RW */
            {
            Δ=0;
                for (k=0; k<n; k++)    /* vertical traversal of CB */
                    for (l=0; l<n; l++) /* horizontal traversal of CB */
                    {
                    Δ += abs(New[g.n + k][h.n + l]-Old[g.n + i + k][h.n + j +l];)
                    }
            Δopt[g][h] = min(Δ,Δopt[g][h]);
            }
    }
```

METHOD FOR DETERMINING AN OPTIMIZED MEMORY ORGANIZATION OF A DIGITAL DEVICE

RELATED APPLICATION

This application claims priority to U.S. Provisional Application No. 60/094,124, filed on Jul. 24, 1998.

FIELD OF THE INVENTION

The invention relates to methods for designing essentially digital devices, and focuses on memory related design issues, more in particular with respect to power consumption of said digital devices.

BACKGROUND OF THE INVENTION

The use of a memory hierarchy for optimizing at least power consumption of said essentially digital devices, performing data-dominated applications, has been demonstrated in [L. Nachtergaele, F. Catthoor, B. Kapoor, D. Moolenaar, S. Janssen, "Low power storage exploration for H.263 video decoder", IEEE workshop on VLSI signal processing}, Monterey Calif., October 1996.] for a H.263 video encoder and in [S. Wuytack, F. Catthoor, L. Nachtergaele, H. De Man, "Power Exploration for Data Dominated Video Applications", Proceedings IEEE International Symposium on Low Power Design, Monterey, pp.359–364, August 1996.] for a motion estimation application. The idea of using a memory hierarchy to minimize the power consumption of said essentially digital devices is based on the fact that memory power consumption depends primarily on the access frequency and the size of the memories. Power savings can be obtained by accessing heavily used data from smaller memories instead of from large background memories. Such an optimization requires architectural transformations that consist of adding layers of smaller and smaller memories to which frequently used data can be copied. Memory hierarchy optimization introduces copies of data from larger to smaller memories in the data flow graph. This means that there is a trade-off involved here: on the one hand, power consumption is decreased because data is now read mostly from smaller memories, while on the other hand, power consumption is increased because extra memory transfers are introduced. Moreover, adding another layer of hierarchy can also have a negative effect on the area and interconnect cost, and as a consequence also on the power consumption because of the larger capacitance involved. The memory hierarchy design task has to find the best solution for this trade-off. Some custom memory hierarchy experiments on real-life applications can be found in literature but often the search space, being the potential memory hierarchies which can be exploited, is not extensively examined. No systematic exploration method for deciding on which memory hierarchy is optimal with respect to power consumption of said digital system is known.

Memory hierarchy design for power optimization is basically different from caching for performance optimization [J. Fang, M. Lu, "An iteration partition approach for cache or local memory thrashing on parallel processing", IEEE Transactions on Computers, Vol.C-42, No.5, pp.529–546, May 1993.],[D. Kulkarni, M. Stumm, "Linear loop transformations in optimizing compilers for parallel machines", Technical report, Comp. Systems Res. Inst., University of Toronto, Canada, October 1994.], [N. Manjiakian, T. Abdelrahman, "Reduction of cache conflicts in loop nests", Technical report CSRI-318, Comp. Systems Res. Inst., University of Toronto, Canada, March 1995.], [M. Jimenez, J. Llaberia, A. Fernandez, E. Morancho, "A unified transformation technique for multi-level blocking", Proceedings EuroPar Conference, Lyon, France, August 1996. "Lecture notes in computer science" series, Springer Verlag, pp.402–405, 1996.]. The latter determines how to fill the cache such that data has been loaded from main memory before it is needed. Instead of minimizing the number of transfers, the number of transfers is often increased to maximize the chance of a cache hit, leading to wasted power by pre-fetching data that may never be needed.

AIM OF THE INVENTION

It is the aim of the invention to present a formalized method and system for part of the design decisions, related to memory, involved while designing an essentially digital device. The method and system defines how to traverse through and how to limit the search space being examined while solving these memory related design decisions. The method and system focuses on power consumption of said essentially digital device.

SUMMARY OF THE INVENTION

A basic idea of the invention is that power consumption in a digital device can be optimized by introducing a particular organization in the memory such that frequently accessed data can be obtained from smaller memories instead of from the often large main memory. In the invention, data reuse possibilities are examined. Such a memory organization defines a memory hierarchy and distributes the memory space needed in said digital device over a plurality of memories. The invented optimization of said power consumption is aimed not only at power consumption minimization but also prevents large increases of total memory area. Note that power consumption minimization results in less energy consumption of said digital device, which can be of practical importance for instance in a wireless context. Also the power dissipation is reduced, which can possibly avoid packaging problems.

A digital device (6, FIG. 1) comprises of a processor (2) with its own local registers (3) and a memory part (1). The memory can be organized in several manners. It can be only one off-chip memory or a serial and/or parallel concatenation of memories (partly off-chip and on-chip). In the invention such a concatenation (further called a memory hierarchy) is assumed. Said hierarchy comprises of a main memory (4) and intermediate memories (5). Memory layers can be defined. Two memories belong to the same layer when said memories are functionally at the same distance from the processor, meaning the same amount of memories are between said memories of said layer and said processor.

In the invention a method for determining an optimized memory hierarchy or organization (how many memories, which size for each memory, interconnection patterns of said memories, for example), such that the digital device can run with an optimal and/or minimal power consumption, is presented. Said optimized memory hierarchy construction is based on examination of data reuse possibilities.

A digital device (6) has a certain functionality, which can be represented by code (24), written in a suitable programming language. The invention focuses on data-dominated applications which are defined as applications wherein power consumption due to accessing data in memories dominates the power consumption due to arithmetic operations. Loop constructs (8) and read instructions (9) on array signals (10), being often defined also as multidimensional data types, are therefore considered to be most important with respect to power consumption optimization.

Indeed each read instruction means accessing a memory. The goal of introducing a memory hierarchy is to ensure that the required data is obtained from a smaller (and thus less power consuming) memory. The data stored in the smaller memories is preferably reused thus improving efficiency. It must be emphasized that introducing a memory hierarchy also requires some code modifications. It must be indicated in each read instruction from which memory the data is read. It must be mentioned that the invention presents a method for determining potential memory organizations. Note that the digital device (6) under consideration must, for the method in accordance with the present invention, only be described with code, describing its functionality. The digital system being considered and optimized is thus need not yet be realized in hardware. The method according to the invention can be exploited in the design steps for such a digital system. Said potential memory organizations can thus serve as indications of how to organize the actual memory of said digital system. The actual assignment of array signals to particular memories is however not necessarily part of the method according to the invention but is not excluded therefrom. Therefore, in the method the terminology "copy-candidates", being memories with a particular size, is exploited in order to emphasize that in the method candidates are considered rather than final memories and a decision about the actual memories is not necessarily taken but is not excluded.

The storage of data in a plurality of memories requires also additional reads from the memories in the memory organization and thus leads to additional power consumption. The method according to the invention can include the step of checking whether introducing memory hierarchy helps in optimizing and/or minimizing power or not and whether such a power optimization can be done without a large increase of the total memory size of the memories of said digital device. Hence, the present invention includes optimization of memories based on one or more evaluation criteria. For example, additional power consumption due to more interconnects can also be taken into account.

Data is heavily accessed when it is read or written from within a loop. A loop construct (8) typically comprises of an introductory statement (FOR), defining the loop iterators, a loop body, comprising of arithmetic operations, write and read instructions (9), and a finalizing statement (ENDFOR), closing the loop. When loops are embedded in other loops, a loop nest is defined. A loop nest can be characterized by its loop depth.

In a first aspect of the invention a method and system for determining an optimized memory organization of an essentially digital device is described. The method and system exploits the code description of the functionality of said digital device and essentially uses the loop constructs (loop nests) and read instructions on array signals found in said code.

The present invention includes an automated design system for determining an optimized memory organization of an essentially digital device represented by a code describing the functionality of said digital device, the code comprising read instructions on array signals, the design system comprising: a first computing device for determining for at least one array signal and for at least one read instruction on said array signal a hierarchical chain with a plurality of reusable data groupings; a second computing device for evaluating for combinations of said reusable data groupings an evaluation criterion; a third computing device for selecting the combination of said reusable data groupings with the optimal and/or lowest value of the evaluation criterion; and a fourth computing device for outputting said optimized memory organization determined from said selected combination of said reusable data groupings. The first to fourth computing devices may be comprised by a single computer such as a work station running suitable software for implementing the present invention and using the code describing the digital device as an input. The evaluation criterion may be power consumption. The second computing device may also evaluate combinations in accordance with a further evaluation criterion, e.g. memory size, and the third computing device may select in accordance with a combination of both the evaluation and the further evaluation criteria. The system includes determining the actual physical memories of the digital device in accordance or in dependence upon the output of the fourth computing device.

The present invention includes a method for determining an optimized memory organization of an essentially digital device, comprising the steps of: loading code describing the functionality of said digital device; said code comprising read instructions on array signals; determining for at least one array signal and for at least one read instruction on said array signal a hierarchical chain with a plurality of reusable data groupings; evaluating for combinations of said reusable data groupings an evaluation criterion; selecting the combination of said reusable data groupings with the optimal and/or lowest value of the evaluation criterion; determining from said selected combination of said reusable data groupings said optimized memory organization.

In the method, five main steps (19, FIG. 2), (20), (21), (22), (23) can be identified, being copy-candidate chain construction, copy-candidate tree construction, copy-candidate graph construction, copy-candidate reuse set construction and finally selection, respectively.

The method and system explores data reuse possibilities and does that by evaluating the effect on power consumption and/or memory size of considering reusable data groupings.

The method steps are performed for essentially each array signal in said code separately and must be performed for at least one array signal. Naturally, some array signals can be excluded when the designer thinks that this array signal will not significantly contribute to the power consumption of said digital device. All the considered array signals can be represented in a set (11, FIG. 2). All the read instructions on one array signal can be represented as a subset (12) of the set of all read operations on array signals (11) in said code.

In a first step (19) for each read instruction in said code on the array signal under consideration a copy-candidate chain (33, FIG. 3) is constructed. This results in a set of copy-candidate chains (13, FIG. 2). A copy-candidate chain comprises a serial concatenation of copy-candidates, each representing a memory which can potentially be used in the final digital device. Said copy-candidate chains can be grouped in a set (15) of copy-candidate chains associated with a particular array signal. Said copy-candidate chain can be denoted as a hierarchical chain of reusable data groupings.

In a second step (20, FIG. 2) from at least part of said copy-candidate chains a copy-candidate tree (26) is constructed. In such a copy-candidate tree at least the root node of said copy-candidate tree is equal to the root node of said part of copy-candidate chains, which are equal by construction. The copy-candidate tree at least comprises of a subset of the copy-candidates of said part of said copy-candidate chains. Said copy-candidate trees define a copy-candidate tree set (15). Note that for copy-candidate tree construction at least one copy-candidate chain is necessary. Not all copy-candidate chains of an array signal are however involved. Indeed read instructions on an array signal can be grouped. For each group a copy-candidate tree can be constructed.

In a third step (21) for at least one of said copy-candidate trees a copy-candidate graph (27, FIG. 3) is constructed. Such a graph comprises of nodes (28), (30) representing memories/copy-candidates and edges (29), representing data-transfers between said memories/copy-candidates. For each grouped set of read instructions on an array signal a copy-candidate graph, being part of the copy-candidate graph set (16), can be constructed.

In a fourth step (22) for at least one of said copy-candidate graphs a copy-candidate reuse set (17), (31) is constructed. Each element in said set represents a possible memory hierarchy.

Such an element of said copy-candidate reuse set can also be denoted to be a combination of data reusable groupings. Indeed such a combination can be represented by nodes and their interconnecting edges.

In a fifth and last step (23) for at least one group of read instructions on an array signal one element is selected from the copy-candidate reuse set, associated with said group of read instructions on said array signal and said selected element is placed in an optimal copy-candidate reuse set (18). The elements of said optimal copy-candidate reuse set define said optimized memory organization of said digital device for a group of read instructions on an array signal.

Note that said copy-candidate chain, copy-candidate, copy-candidate graph, copy-candidate reuse set all represent data reuse possibilities. Said copy-candidate chain can equivalently be denoted as a hierarchical chain of reusable data groupings. Said combination of reusable data groupings is an element of the copy-candidate reuse set and can be constructed from said copy-candidate graph.

In an embodiment of the invention said steps are performed for all array signals in said code, describing the functionality of said essentially digital device, selected by the designer of said digital device.

In an embodiment of the invention copy-candidate graphs are constructed from all copy-candidate chains on an array signal, meaning that thus all read instructions of said array signal are grouped in one set. This results in one copy-candidate reuse set for said array signal. The optimal element selected from said copy-candidate reuse set represents then an optimized memory organization of said digital device for said array signal.

In an embodiment said selection and placing of an element of a copy-candidate reuse tree is done after calculating for essentially all elements of said copy-candidate reuse sets an evaluation criterion. Then for each of said copy-candidate reuse sets, the element with the best evaluation criterion is placed in an optimal copy-candidate reuse set (18) whereby said elements in said optimal copy-candidate reuse set represent said optimized memory organization of said digital device.

In an embodiment of the invention said evaluation criterion can be an estimate of the power consumption of said digital device when said digital device would have the memory organization as represented by said element in said copy-candidate reuse set. In embodiment in said evaluation criterion besides power consumption estimates also an estimate of the total memory area of such a memory organization can be taken into account.

It should be emphasized that the method according to the invention works on an array on a signal by-signal basis.

In a second aspect of the invention a method for constructing a copy-candidate chain for a read instruction on an array signal is presented. A copy-candidate chain (33) comprises of a serial concatenation of memories/copy-candidates. The first memory/copy-candidate of the chain is a memory (4) of the digital device, which can store the whole array signal. A loop construct (8) results in a repetitive execution of the loop body. Each execution is called an iteration. A read instruction accesses some data from the main memory (as long as no memory hierarchy is used of course). As the data accessed by the considered read instruction during different iterations can be different in size, the maximum size of all iterations of the considered loop construct must be determined. This maximum size determines a so-called copy-candidate. This is a representation of a memory, to be put in the copy-candidate chain and possibly later in the memory hierarchy. Its size is equal to the maximum size found for that loop construct. Although it is of no use to introduce copy-candidates of size one (as this would be just a register) this is preferably not introduced in the method as a constraint. The exploration method will reject this possibility anyway. The copy-candidates are organized in a chain. The copy-candidates are ordered by size, including that copy-candidates of the same size are represented only once. Note that said ordering of copy-candidates is determined by the ordering of the loop construct to which said copy-candidates are associated. Copy-candidates associated by an outer loop construct are by construction larger or equal to copy-candidates related to an inner loop construct. The copy-candidates can be represented by blocks (as in (25)) or by nodes (as in (27)). The size of the blocks represents the size of the memories. More formally the nodes have a number, said number represents the size of the memories. It is clear that the nesting of loop nests introduces a hierarchy between copy-candidate or reusable data groupings, thus a hierarchical chain of reusable data groupings is introduced.

In an embodiment of the present invention said number can be found by determining the bit width and the word depth of said memories. The bit width is fixed for all memory/copy-candidates of one copy-candidate chain and copy-candidate tree because the bit width is determined by the required bit width of the array signal under consideration. Note that in the above defined procedure a read operation is considered to be embedded in at least one loop (loop construct). Indeed it is assumed that only array read instructions embedded in loop are dominating power consumption as these are frequently accessed. It must also be clear that the first memory/copy-candidate of the chain is just the main memory (with its size determined by the array signal under consideration).

This procedure is illustrated for a piece of code (34). Loop construct 3 has a set of copy-candidates of size one. Implicitly this candidate is rejected. Loop construct 2 has a set of copy-candidates of size six. The maximum size is naturally six which is a valid copy-candidate. For the last loop construct 1 a copy-candidate of also six is found. Naturally this is merged in the chain with the copy-candidate of the previous loop construct.

In a third aspect of the invention a method for constructing a copy-candidate tree (26) for an array signal from the corresponding copy-candidate chains (25) is presented. The root node of the copy-candidate tree is the root node of the copy-candidate chains on which the tree is based, thus equals the main memory/copy-candidate (4)(30). The copy-candidate tree construction at least comprises of identifying said root node as the root node of said copy-candidate chains, being equal by construction.

The copy-candidate chains can share a node (a copy-candidate, a memory of the hierarchy) when their corresponding copy-candidates contain essentially the same data. Therefore in an embodiment of said third aspect of the invention in said construction of said copy-candidate tree at least nodes of said copy-candidate chains which contain essentially the same data can be shared.

Said construction of a copy-candidate tree does not necessarily exploit all copy-candidate chains of said array signal. Indeed read instructions on an array signal can be grouped in different groups. Such a group contains a least one read instruction. A read instruction on an array signal defines a copy-candidate chain. A copy-candidate tree can be constructed for each group of read instructions from the corresponding copy-candidate chains.

In an embodiment of the present invention a copy-candidate tree is constructed for all read instructions of an array signal and thus all corresponding copy-candidate chains.

In an embodiment of the invention a copy-candidate tree is constructed for all read instructions of an array signal being in the same loop nest and thus all corresponding copy-candidate chains.

In a fourth aspect of the invention a method for constructing a copy-candidate IS graph (27) from a copy-candidate tree (26) is presented. A copy-candidate graph consists of nodes. Each node represents a copy-candidate, being a potential memory of the optimized memory hierarchy. For each node of said copy-candidate tree edges from all its ancestor nodes are drawn. An edge (29) represents possible data transfer between the copy-candidates (memories) that are connected by said edge. Each edge gets a weighting factor. Said weight factor is an estimate the amount of data-transfer. It must be emphasized that the first node of the graph represents the main memory (30)(4).

In a fifth aspect of the invention a method for constructing a copy-candidate reuse set from a copy-candidate graph is presented. This is done by selecting at least one path from the root node of said copy-candidate graph to one of the leaf nodes of said copy-candidate tree, whereby each path (32) is represented by an element of said copy-candidate reuse set (31). Note that not all the nodes of the copy-candidate reuse graph must be part of a possible path. Only data transfer from the top node (the main memory) (30) should always be incorporated by definition.

In the sixth aspect of the invention a method for calculating an estimate of the power consumption of an element of a copy-candidate reuse set is presented. The power contribution for one read and write instruction from a particular copy-candidate (memory) is to be determined. The power is found by using a power model, which is typically a function of the size of the copy-candidate (memory). This power for one instruction must then be multiplied with the number of times the instruction gets executed, thus the amount of read and write operations respectively, or more in general the data transfer from and to said copy-candidate (memory). Said information (size, amount of transfer) can be found in the copy-candidate graph for each element of the copy-candidate reuse set, by tracking the relevant path (its edges and nodes). Finally all the contributions along such path must be summed.

The present invention and its embodiments will now be described with reference to the following drawings.

BRIEF DESCRIPTION OF THE DRAWINGS

FIG. 7 shows a classification of data reuse opportunities. Code describing the functionality of an essential digital device is shown. Said code can comprise at least of loop constructs and read instructions on array signals. Case (b) with one read instruction in a loop nest is the basic case of the invention. It is assumed that at least one read instruction on an array signal is embedded in at least one loop construct. Therefore one can state that at least for one read instruction of an array signal a copy-candidate chain is constructed. As such a copy-candidate chain is directly related to such a loop embedded read instruction. Case (c) with multiple read instructions in a (nested) loop can also be dealt with by the invention. In an embodiment of the invention copy-candidate chains of such read instructions are combined when their copy-candidates contain essentially the same data. Case (d) with read instructions in different loop nest is in an embodiment of the invention preferably not dealt with directly. Indeed such read instructions are considered separately for studying data reuse opportunities. In another embodiment such a case is incorporated in the method according to the invention, in spite of the increase of the search space.

DETAILED DESCRIPTION OF THE INVENTION

Figure 1:
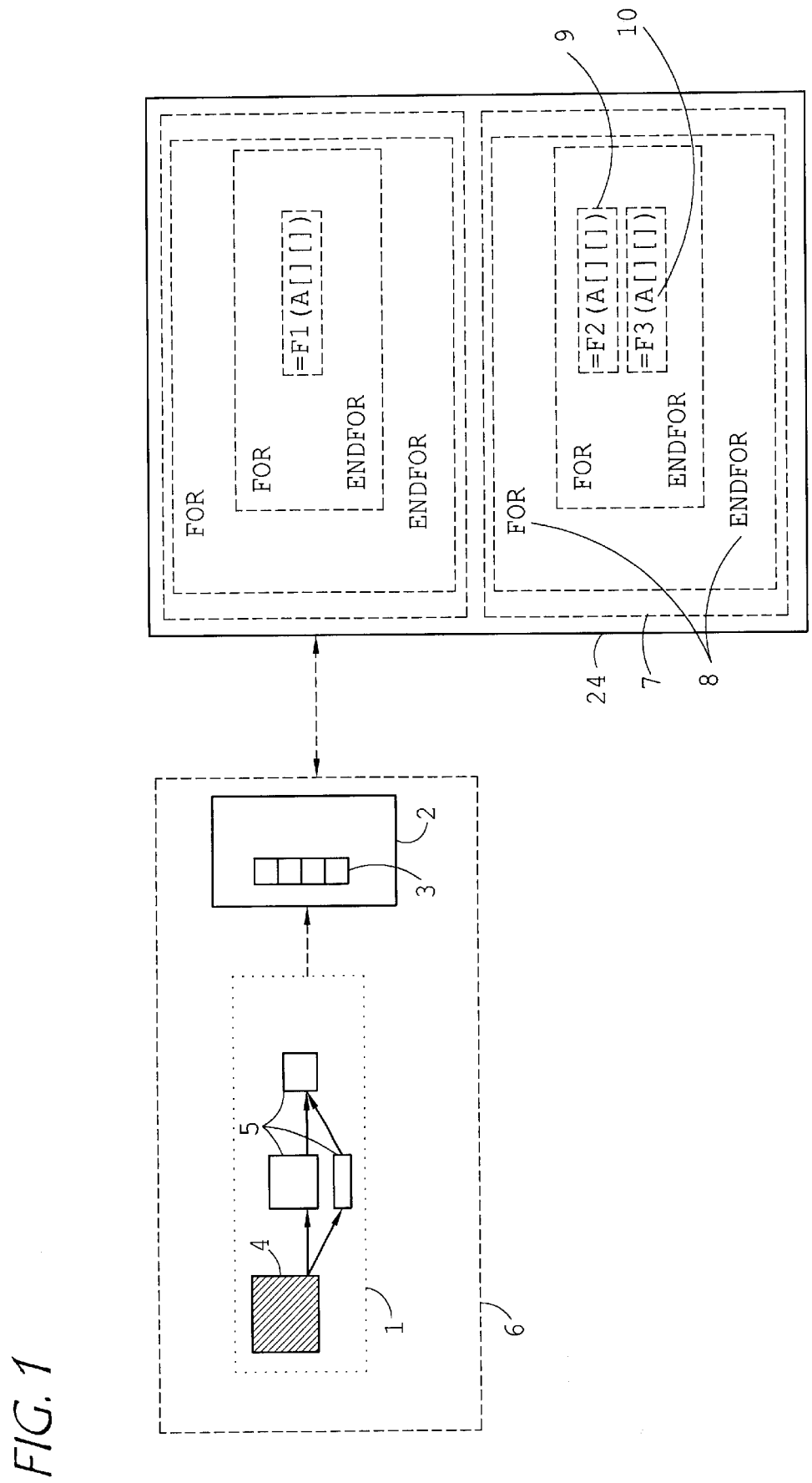
FIG. 1 shows a potential hierarchical and distributed memory organization (1) of an essentially digital device (6), comprising of a processor (2), with its local registers (3) on the processor. The memory organization (1) comprises here of an main memory (4) and intermediate memory levels (5). The digital device (6) is under construction. The method according to the invention exploits code (24) describing the functionality of said digital device. In said code loop constructs (8) are found, potentially embedded in loop nests (7). Further in the invention only read instructions (9) on array signals (10) embedded in at least one loop construct are considered.

A detailed description of several embodiments of the invention are given below although the invention is not limited hereto.

Memory accesses contribute to the power consumption of an essentially digital device. Exploiting in said digital device temporal locality in said memory accesses, also denoted data transfer and storage, by means of an optimized memory hierarchy, being a plurality of memories, can effectively reduce the overall power dissipation of data-dominated applications, realized by said digital device. Data-dominated applications are characterized as being applications wherein most power dissipation is due to accesses to memory instead of arithmetic operations. Such a memory access power dissipation is closely related to read operations to multidimensional array signals, more in particular array signals which are included in a loop construct or even in a plurality of loop constructs, said plurality defining a loop nest. Such read operations can be recognized in the code, being written in a particular description language, specifying the functionality of said digital device. Determining an optimized memory hierarchy, with respect to power consumption and total memory area, is part of the design steps for designing such a digital device. The method according to the invention determines an optimized memory organization or even a plurality of such memory organizations. Such an optimized memory organization or plurality of memory organizations can be used during subsequent design steps, resulting possibly in further modifications of said memory organizations. The method according to the invention is therefore also denoted to be a first step in designing the actual memory hierarchy of an essentially digital system. Said first step is denoted also the data reuse decision step. A second step in designing the actual memory hierarchy is the memory assignment, wherein a final decision is taken on which array signals are assigned to which memory. In the invention a systematic method for the data reuse decision step has been proposed based on a number of realistic assumptions. The feasibility and the large impact of the proposed techniques have been shown on a real-life video application. The results obtained for a motion estimation application show power reductions of about 85% for the memory sub-system compared to the case without memory hierarchy. These figures do not include the power dissipation in the interconnect between memories and between memories and data paths. Taking this into account will result in even larger gains. These large power gains justify the utility of the present invention and also that decisions related to the memory hierarchy and especially about the data reuse should be decided early in the design flow.

In the invention a method for determining an optimized memory organization of a digital device is presented. Said digital device (6) has a certain functionality, which can be represented by code (24), written in a suitable programming language. Loop constructs (8) and read instructions (9) on array signals (10) are considered to be most important with respect to power consumption optimization.

Figure 5:
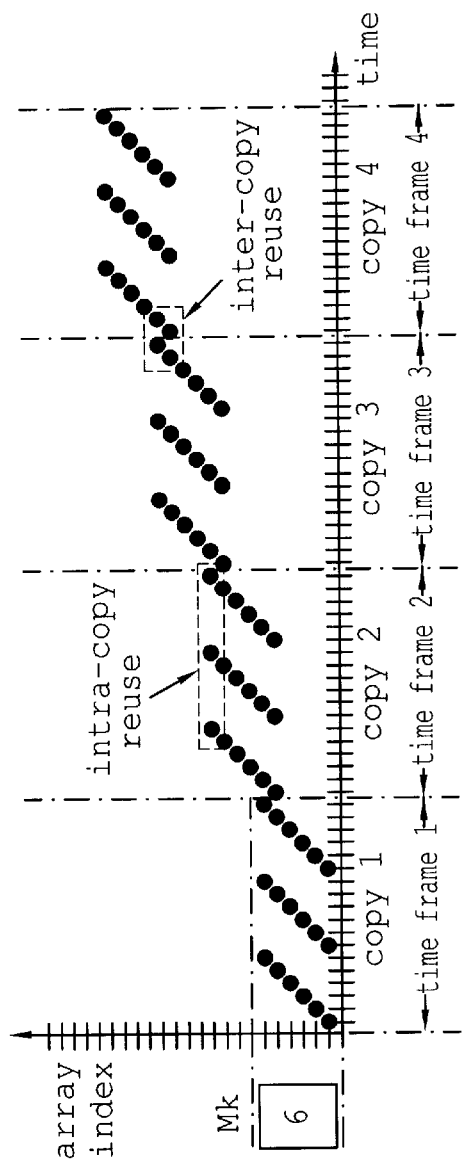
FIG. 5 shows code describing the functionality of a digital device. Said code shows 3 embedded loop constructs and a read instruction. The data accesses are shown as a function of time. Intra-copy and inter-copy reuse is illustrated. A copy-candidate of size 6 is proposed. Also time-frames are indicated.
Figure 6:
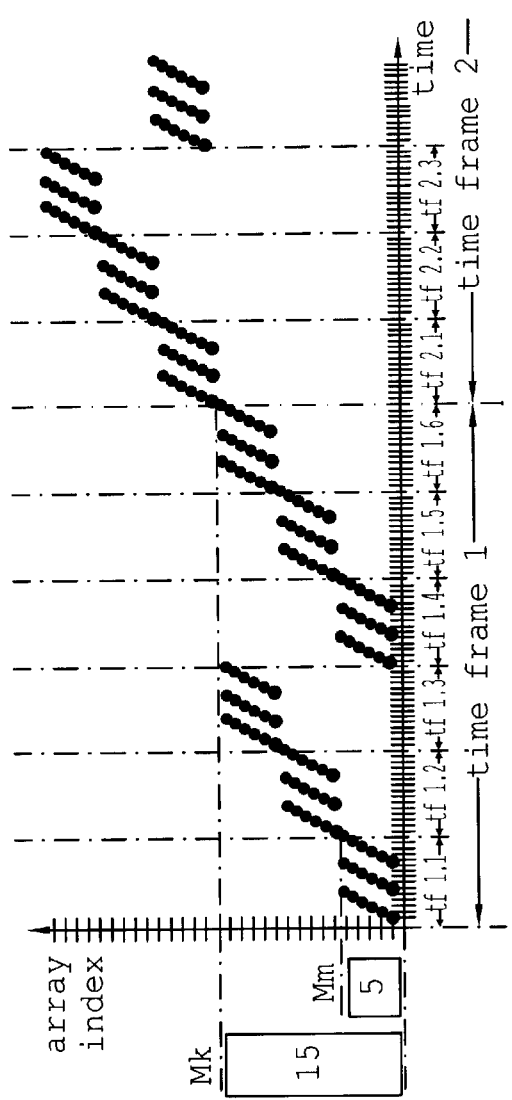
FIG. 6 shows code describing the functionality of a digital device. Said code shows 5 embedded loop constructs and a read instruction. The data accesses are shown as a function of time. Memory reuse opportunities are illustrated. Two copy-candidates of respectively size 5 and 15 are proposed. Said copy-candidates are related to time-frames of different length.

FIGS. 5 and 6 show codes, describing the functionality of a digital system to be designed. Said codes loop constructs, comprise an introductory statement (FOR), defining the iterators and their scope, a closing statement (}) and a loop body with a read instruction to a variable A. The horizontal axis is the time axis. It shows how the data accesses to the variable A are ordered relatively to each other in time. The vertical axis shows the index of the data element (scalar) that is accessed from the array. Every dot represents a memory read operation, being an evaluation of the read instruction for particular values of the iterators, scheduled at a certain time and accessing a given data element. It can be seen that, in this example, most values are read multiple times. Assuming that the data is still needed later on, all data values of the array have to be stored in a large background memory. However, when smaller time-frames (indicated by the vertical dashed lines) are considered, it is seen that only part of the data is needed in each time-frame, so this part of the data could fit in a smaller, less power consuming memory. If there is sufficient reuse of the data in that time-frame, it can be advantageous to copy the data that is used frequently in this time-frame to a smaller memory. Consequently, the second time a data element has to be read, it can be read from the smaller memory instead of the larger memory. Data reuse is the result of intra-copy reuse and inter-copy reuse, as indicated in FIGS. 5 and 6. Intra-Copy reuse means that each data element is read several times from its memory during one time-frame. Inter-Copy reuse means that advantage is taken from the fact that part of the data needed in the next time-frame could already be available in the memory from the previous time-frame, and therefore does not have to be copied again. Taking full advantage of temporal locality for power, usually requires architectural transformations that consist of adding several layers of memories (each corresponding to its own time-frame level) between the large background memories and the small foreground memories (registers in the data-path). Every layer in the memory hierarchy contains smaller memories than the ones used in the layer above it. An example of this is shown in FIG. 6. It shows time-frames that are subdivided into smaller time-frames. Each level of time-frames potentially corresponds to a memory layer in the memory hierarchy.

Figure 2:
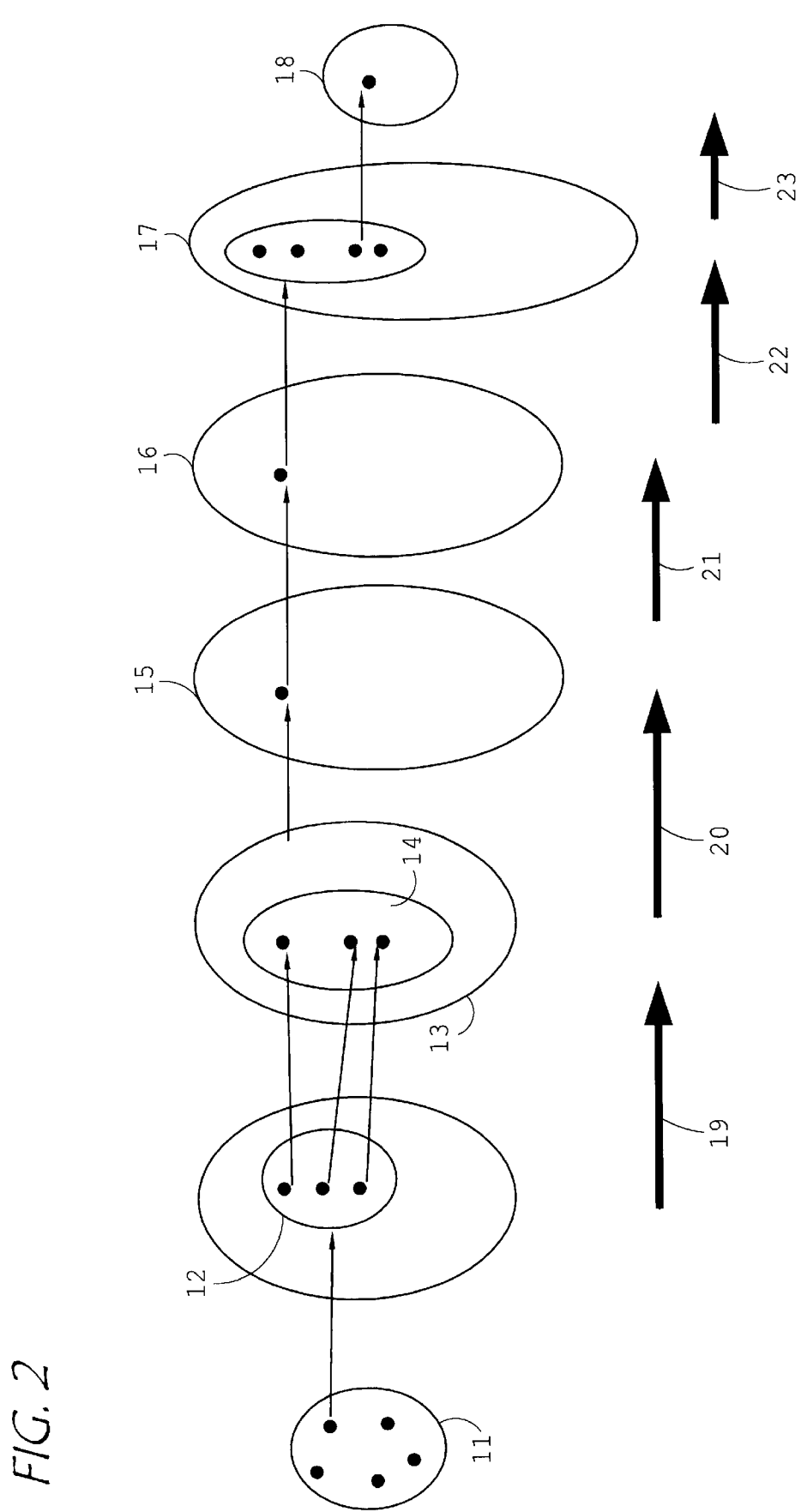
FIG. 2 shows the different sets involved and the ordering in which they are involved in the method according to the invention. A first set (11) is the set of selected array signals found in the code, which will be taken into account in the method according to the invention. Said selection can be done by the designer of said digital system. A next set (12) is the set of read instructions found in the code on a particular array signal. This set is a subset of a larger set of all read instructions found in the code. As for each read instruction a copy-candidate chain is constructed (step (19) in the method according to the invention)) a set of copy-candidate chains for that particular array signal can be defined (14). Set (14) is a subset of the set of copy-candidate chains (13). As from at least part of said copy-candidate chains of each array signal a copy-candidate tree is constructed (step (20) in the method according to the invention) a set (15) of copy-candidate trees is defined. Further from each element of set (15) a copy-candidate graph is constructed (step (21)), thereby defining copy-candidate graph set (16). From said copy-candidate graph, elements, representing a path in said copy-candidate graph, are created (step (22)). Said elements belonging to a particular copy-candidate graph define a subset (17). From said elements an optimal element, according to a particular evaluation criterion, is selected (step (23)). This is done for each array signal involved. As such a plurality of optimal elements are selected, thereby defining a set (18), said set with its elements are representing an optimized memory organization, which can potentially be used for the digital device under construction or to be designed.

In the invention a method for determining an optimized memory organization of an essentially digital system is described. The method exploits the code description of the functionality of said digital system and essentially uses the loop constructs (loop nests) and read instructions on array signals found in said code. In the method five main steps (19, FIG. 2), (20), (21), (22), (23) can be identified being copy-candidate chain construction, copy-candidate tree construction, copy-candidate graph construction, copy-candidate reuse set construction and finally selection of an optimal memory organization. These steps are performed for essentially each array signal in said code separately and must be performed for at least one array signal. Naturally some array signals can be excluded when the designer thinks that this array signal will not significantly contribute to the power consumption. A "copy-candidate" is a candidate for copying into a smaller memory for re-use purposes. The method and system according to the present invention constructs these copy-candidates and then selects an optimum combination thereof to optimize at least one evaluation criterion.

In a first step (19, FIG. 2), for at least one read instruction in said code on the array signal under consideration, a copy-candidate chain (33, FIG. 3) is constructed. This results in a set of copy-candidate chains (13, FIG. 2). A copy-candidate chain comprises of a serial concatenation of copy-candidates, each copy-candidate representing a memory which can potentially be used in said digital device. Said copy-candidate chains can be grouped in a set (15) of copy-candidate chains associated with a particular array signal. The invention presents a systematic method for constructing copy-candidate chains for a read instruction on an array signal. A copy-candidate chain (33, FIG. 3) comprises of a serial concatenation of memories/copy-candidates. The first memory/copy-candidate of the chain is a memory (4, FIG. 2) of the digital system, which can contain the whole array signal. A loop construct (8) results in a repetitive execution of the loop body. Each execution is called an iteration. A read instruction accesses some data from the main memory (as long as no memory hierarchy is used of course). As the data accessed by the considered read instruction during different iterations can be different in size, the maximum size of all iterations of the considered loop construct must be determined. This maximum size determines a so-called copy-candidate. This is a memory, to be put in the copy-candidate chain and possibly later in the memory hierarchy. Its size is equal to the maximum size found for that loop construct. Its purpose is to allow reuse of the data therein so as to avoid accessing a larger memory for the same information. Although it is of no use to introduce copy-candidates of size one (as this would be just a register) this is preferably not introduced in the method as a constraint. The exploration method will reject this possibility anyway. The copy-candidates are organized in a hierarchical chain. The copy-candidates are ordered by size, including that copy-candidates of the same size are represented only once. Note that said ordering of copy-candidates is determined by the ordering of the loop construct to which said copy-candidates are associated. Copy-candidates associated by an outer loop construct are by construction larger or equal to copy-candidates related to an inner loop construct. The copy-candidates can be represented by blocks (as in (25, FIG. 3)) or by nodes (as in (27)). The size of the blocks represents the size of the memories. Note that in the above defined procedure a read operation is considered to be embedded in at least one loop (loop construct).

More formally the execution time of an application, realized by said digital device, can be subdivided into a number of non-overlapping time-intervals, called level 1 time-frames. Each level i time-frame can be subdivided further into non-overlapping level i+1 time-frames. A copy-candidate corresponding to an array signal A and time-frame $TF_i$ is then defined as a set of data elements of A that are read in $TF_i$. A copy-candidate is a group of data that is a potential candidate to be copied to a smaller memory at a lower level in the hierarchy. During the data reuse task for which the invention presents a systematic approach it will be decided which copy-candidates are really worth being copied in order to save power. Once this decision is made, the transfers for making the copies will be added to the application code and the copy-candidates become real (partial) copies of their corresponding arrays. It must be mentioned once more that during design of said digital system, and more in particular during design of the memory organization of said digital system two steps must be distinguished. The data reuse exploration and decision step, being the first step, performed by the invention, decides which intermediate copies have to made for accessing the data in a power efficient way. Possibly the same data has to be copied several times to get the optimal result. FIG. 6 shows some examples of this. For instance, the data copied in time frame 1.1 and 1.4 is exactly the same, but has to be copied twice to keep memory Mm smaller than memory Mk. In the memory layer assignment step, being the second step, it is decided for each array and copy of an array on which layer in the common custom memory hierarchy it will be stored. After memory layer assignment, an optimal memory architecture has to be derived for each layer. This is done by the subsequent memory allocation and array-to-memory assignment tasks in the digital system design steps [F. Catthoor, S. Wuytack, E. De Greef, F. Franssen, L. Nachtergaele, H. De Man, "System-level transformations for low power data transfer and storage", chapter in Low power design" (eds. B. Brodersen, A. Chandrakasan), IEEE Press, 1998.][L. Nachtergaele, F. Catthoor, F. Balasa, F. Franssen, E. De Greef, H. Samsom, H. De Man, "Optimisation of memory organisation and hierarchy for decreased size and power in video and image processing systems", Proceedings International Workshop on Memory Technology, Design and Testing, San Jose Calif., pp.82–87, August 1995.]. These tasks are described in [P. Slock, S. Wuytack, F. Catthoor, G. de Jong, "Fast and Extensive System-Level Memory Exploration for ATM Applications", Accepted for Proceedings 10$^{th}$ ACM/IEEE International Symposium on System-Level Synthesis}, Antwerp, Belgium, September 1997.].

In the method according to the present invention only read operations are considered. Data reuse exploration and decision has to focus on read operations only. The reason is that repeated reading of the same data value makes sense, whereas writing the same data value is usually of little use. So there is no need for creating a memory hierarchy for repeatedly written data. The only thing that has to be decided for write operations is in which layer a certain (temporary) array will be written. This is decided in the memory layer assignment step after data reuse decisions are made.

In the method according to the present invention at least one array signal must be considered. When a plurality of array signals is considered only one array has to be considered at a time. Data reuse exploration can be tackled for each array separately. The main reason for this is that each copy in the memory hierarchy has its own root array, i.e., the copies form a tree where the root is the original array that is being accessed. A copy cannot be obtained as the mix of different arrays. It is also assumed that the data reuse decision can be taken for each array separately.

In the invention a method for constructing a copy-candidate tree (26) for an array signal from at least part of said copy-candidate chains (25) is presented. The root node of the copy-candidate tree is the root node of the copy-candidate chains on which the tree is based, thus equals the main memory/copy-candidate (4)(30). The copy-candidate tree construction at least comprises of identifying said root node as the root node of said copy-candidate chains, being equal by construction.

The usefulness of memory hierarchy for saving power is strongly related to the array's data reusability, because this is what determines the ratio between the number of read operations from a copy of an array in a smaller memory, and the number of read operations from the array in the larger memory on the next hierarchical level. The reuse factor of a group of data D stored in a memory on layer i relative to layer i–1, where layer 0 is the memory furthest from the data paths, is defined in Formula 1 where $N_R(M_i,D)$ is the total number of times an element from D is read from a memory at layer i. A reuse factor larger than 1 is the result of intra-copy reuse and inter-copy reuse (FIGS. 5 and 6). If $F_R(1,D)=1$, a memory hierarchy is useless and would even lead to an increase of area and power, because the number of read operations from $M_0$ would remain unchanged while the data also has to be stored and read from $M_1$. Therefore in an embodiment of the invention copy-candidates with a data reuse factor lower than a certain predefined threshold are excluded from the data reuse tree. In a further embodiment said threshold value is one.

$$F_R(i, D) = \frac{N_R(M_i, D)}{N_R(M_{i-1}, D)} \quad \text{Formula 1}$$

FIG. 7 shows a classification of four cases of typical code, describing the functionality of an essentially digital device. Said cases are discussed with respect to memory hierarchy and data reuse opportunities.

In a first case (a) there are no loops in the code. In said case there is no structured use of arrays. In fact, each array element is treated independently from the others similar to scalars. Depending on the temporal locality, it may be useful to copy a scalar to a foreground register and keep it there, such that it can be reread from the register a number of times. In principle multiple time-frames have to be considered in order to limit the amount of foreground registers. In other words, a scalar can be copied several times from the background memory to a register, from where it can be read multiple times before it is overwritten by another scalar. Only intra-copy reuse is possible here, because at the end of each time-frame, the register will be overwritten by another scalar, such that inter-copy reuse is not possible. Preferably this case is not considered in the inventive method. It is left for scalar methods which are more suited for this.

The second case (b) is the one with one read instruction in a (nested) loop. This is the basic case on which the method according to the invention is based. Both intra-copy and inter-copy reuse are possible here, when the loop nesting (i.e., the order of the different nested loops, and the direction in which the loops are traversed) is fixed. Indeed, in this case, the ordering of the different copies is known and every two consecutive copies can be examined for overlap (i.e., inter-copy reuse).

In the third case (c) multiple read instructions are found in a (nested) loop. Here it is assumed that each read instruction has a different index expression, because otherwise they can be reduced to the previous case by reading once from background memory and storing the result in a temporary foreground register. When the different read instructions are accessing different parts of the array, a different memory hierarchy can be constructed for each of them. However, in practice, these memory hierarchies will contain partly the same data, and are therefore best combined. Determining which part of the memory hierarchy can be shared, can be done with a geometrical data flow analysis. In an embodiment of the invention, particular array signals can share a node (a copy-candidate, a memory of the hierarchy) when their corresponding copy-candidates contain essentially the same data. Therefore in said construction of said data reuse tree at least nodes of said data reuse chains which contain essentially the same data can be shared.

In the fourth case (d) read instructions are found in different loop nests. In this case, a memory hierarchy is preferably derived for each of the loop nests separately. These memory hierarchies can be very different from each other. Depending on the temporal locality (which is only known when the ordering of all loop nests is already fixed), it may be useful to copy the data that is common to these loops to an extra memory layer. Again a geometrical analysis can be used to determine which part of the array is used in common. Remark that when more than two loops are involved, part of the array can be common to only a few of the loops involved, making things much more complex. Also here, as in case (a), multiple time-frames have to be considered: the data can be copied several times to a lower memory layer. In this case, there is however even more freedom than in case (a), because here the data to be copied to the lower memory layer can be different from time-frame to time-frame.

The method according to the present invention for data reuse exploration is preferably exploited for cases fulfilling a number of assumptions to make the approach feasible for real-life applications. In an embodiment of the invention the order and direction of loop iterators of nested loops is fixed. The fixed nesting order is required to determine the time-frames and copy-candidates corresponding to each read instruction in the loop nest. The fixed iteration direction is required to determine the overlap for estimating the inter-copy reuse. This assumption is valid for the position of this step in the presented global methodology for essentially digital systems in [F. Catthoor, S. Wuytack, E. De Greef F. Franssen, L. Nachtergaele, H. De Man, "System-level transformations for low power data transfer and storage", chapter in "Low power design" (eds. B. Brodersen, A. Chandrakasan), IEEE Press, 1998.]. In an embodiment of the invention time-frames are determined by loop boundaries. Finding an optimal time-frame hierarchy is a very complex problem. However, it is believed that the optimal time-frame boundaries are likely to coincide with the loop boundaries of loop nests. Therefore, in the invention preferably a heuristic is used that the loop boundaries correspond to time-frame boundaries, instead of trying to find globally optimal time-frame boundaries. In an embodiment a copy-candidate contains all data accessed in its time-frame. It is assumed that essentially all data being accessed by a certain read instruction in a certain time-frame will be copied to a copy-candidate, such that all data required by the read instruction can be found inside the copy-candidate. Ideally, only part of the data that is accessed more than once should be copied. The loss due to this restriction is small in practice. In an embodiment all copy-candidates of a time-frame level are stored in-place. It is assumed that at the end of a time-frame, the data copied into the intermediate memory is not needed anymore, and will therefore be overwritten by the data needed in the next time-frame. Therefore, the size of the copy-candidate corresponding to a certain time-frame level is determined by the time-frame leading to the largest copy-candidate. In an embodiment of the invention copy-candidates will be stored in perfectly fitting memories. It is assumed that a copy candidate will be stored in a memory with word depth and bit width equal to those of the copy-candidate. In general, this assumption leads to an underestimation of the power cost, as usually several copy-candidates will have to share a memory. This real memory size is however only known until after array-to-memory assignment and can therefore not be taken into account in the method according to the invention. In an embodiment of the invention inter-copy reuse is fully exploited. This means that data that is already present in the smaller memory from the previous copy will not be copied again. Only the data that is not already present has to be copied over the data of the previous copy that is not needed anymore. This affects the number of accesses to each of the copy-candidates. The size of the copy-candidates is unaffected.

Figure 8:
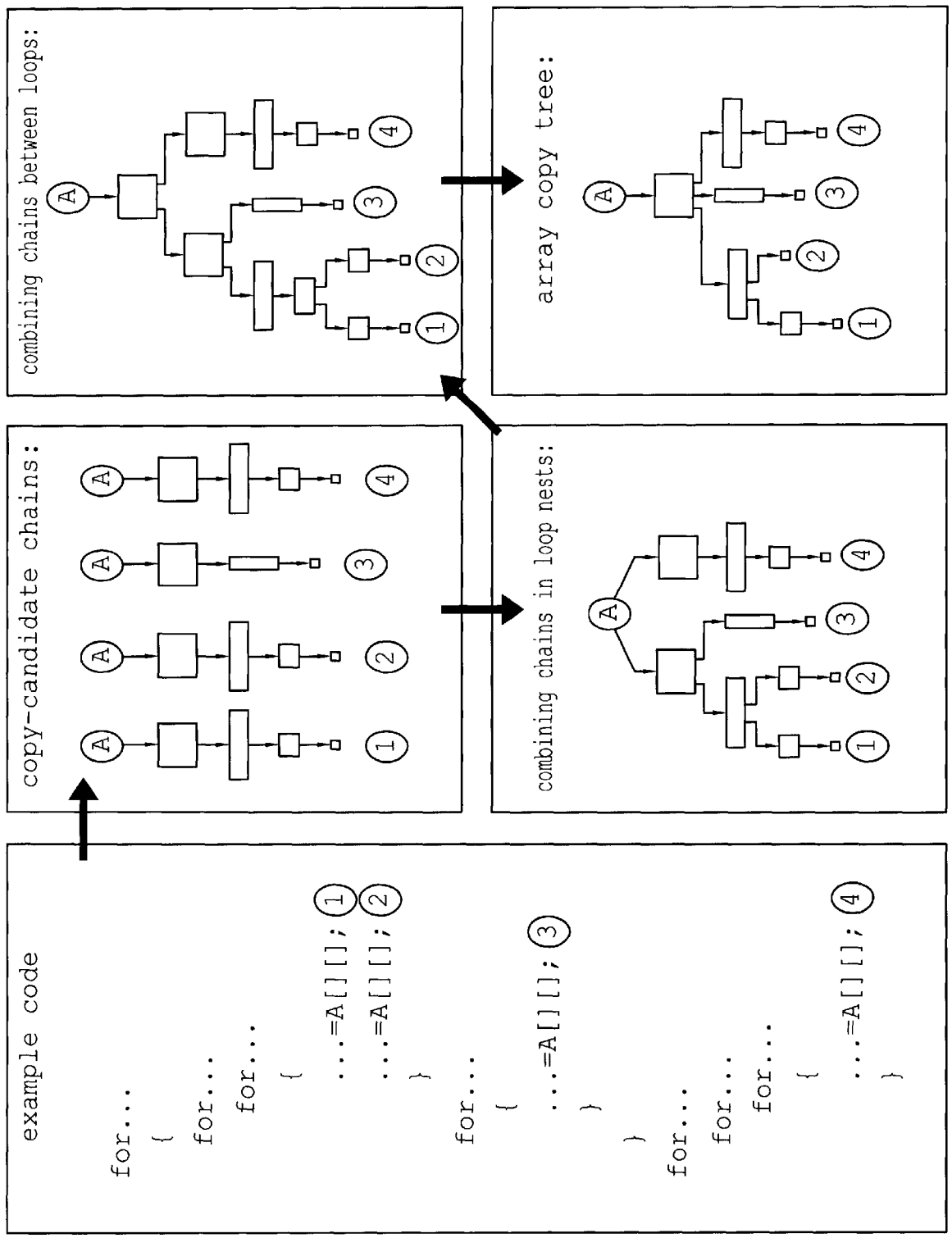
FIG. 8 illustrates the method according to the invention on an example. A piece of code, comprising of read instructions on an array signal, being embedded in loop nests are shown. The copy-candidates for each read instruction are shown. The copy-candidate tree for the signal is shown. Sharing of copy-candidates and introduction of extra copy-candidates is shown.

The systematic data reuse exploration performed by the method according to the invention is now proposed and illustrated with an example in FIG. 8. The method according to the invention determines an optimized memory organization of an essentially digital system in a number of steps. The method exploits the code description of the functionality of said digital system and essentially uses the loop constructs (loop nests) and read instructions on array signals found in said code. Therefore at least a loading step of said code is part of the method according to the invention. In the method five main steps (19), (20), (21), (22), (23) can be identified. These steps are performed for essentially each array signal in said code separately and must be performed for at least one array signal.

In a first step (19) for at least one read instruction in said code on the array signal under consideration a copy-candidate chain (33) is constructed. This results in a set of copy-candidate chains (13). A copy-candidate chain comprises of a serial concatenation of copy-candidates, being memories which can potentially be used in said digital system. Said copy-candidate chains can be grouped in a set (15) of copy-candidate chains associated with a particular array signal.

For each read instruction inside a loop nest, a copy-candidate chain can be determined in the following way. The first copy-candidate in the chain contains all data elements accessed by the given read instruction during the execution of the loop nest. The second copy-candidate in the chain is associated with the iterations of the outer loop. Each iteration has a corresponding time frame. All data elements that are accessed by the read instruction during a given time frame are stored in the corresponding copy-candidate. The storage space of the copy-candidate is shared among the different iterations of the loop. In case the number of elements accessed by the read instruction varies between iterations, the size of the copy-candidate is determined by the iteration that accesses the most data elements. This can be repeated for each of the remaining loop nest levels. Together these copy-candidates form the copy-candidate chain for the considered read instruction. Such a chain represents the maximal exploitation of data reuse of type (b) in FIG. 7.

In a second step (20) from at least part of said copy-candidate chains a copy-candidate tree (26) is constructed. In such a copy-candidate tree at least the root node of said copy-candidate tree is equal to the root node of said copy-candidate chains, which are equal by construction. The copy-candidate tree at least comprises of a subset of the copy-candidates of said copy-candidate chains. Said copy-candidate trees define a copy-candidate tree set (15).

Part of said copy-candidate chains of different read instructions accessing the same array can be combined into a copy-candidate tree for that array. In an embodiment of the invention read instructions belonging to the same loop nest are considered together. Often, the copy-candidates of read instructions belonging to the same loop nest contain the same data. If this is the case for all iterations, the copy-candidate can be shared between the read instructions. Moreover, if a copy-candidate can be shared, also the copy-candidates before it in the chain can be shared. This, combined with the fact that the first copy-candidate in a chain, which is the array itself, can always be shared between read instructions of the same loop nest, means that the copy-candidate chains of a loop nest can always be combined into a copy-candidate tree. Such a tree represents the maximal exploitation of data reuse of type (b) and (c) in FIG. 7. Said embodiment can be formulated as if in the method according to the invention said constructing from said copy-candidate chains a copy-candidate tree further comprises at least sharing nodes of said copy-candidate chains when copy-candidates associated with said nodes contain essentially the same data. In a second case read instructions belonging to different loop nests are considered. Copy-candidates that cannot be combined in the previous way because they belong to different loop nests as in FIG. 7(d), can still share the same data. In this case, an extra intermediate copy-candidate can be inserted in the copy-candidate tree to exploit this data reuse opportunity. When more than two copy-candidates share data in this way, the search space grows quickly: for every possible subset of them an extra copy-candidate could be introduced. Which one(s) should be selected? Ideally, only data that would be read several times from the copy-candidate should be copied into it. So, if more than two copy-candidates are partly overlapping, common data elements should be copied into the intermediate copy-candidate. Because of this significant extra complexity, in an embodiment of the invention this freedom is preferably not considered in the method according to the invention. In such an embodiment the read instructions are treated as operating on independent arrays. In a further embodiment two simple rules can be applied to prune copy-candidates from copy-candidate trees because they will never occur in an optimal memory hierarchy: the size of the copy-candidates must decrease from one layer to the next, and the reuse ratio defined earlier of each layer must be larger than a threshold value. This embodiment can be formalized as a method wherein constructing from said copy-candidate chains a copy-candidate tree further comprises determining the data reuse factor of said copy-candidates and omitting from said copy-candidate tree said copy-candidates with a data reuse factor smaller than or equal to a threshold value. In an embodiment said threshold factor is one. In an embodiment of the method according to the invention the size of the copy-candidate must decrease at least with a predefined amount.

In a third step (21) for at least one of said copy-candidate trees a copy-candidate graph (27, FIG. 3) is constructed. Such a graph comprises of nodes (28), (30) representing memories/copy-candidates and edges (29), representing data-transfers between said memories/copy-candidates. For each array signal at least one copy-candidate graph is found in the copy-candidate graph set (16, FIG. 2).

From the copy-candidate tree constructing step it can be concluded that for every array, at least one a copy-candidate graph can be determined. Each node in the tree represents a copy-candidate. A copy-candidate can be characterized by its required memory size, number of write operations to copy data into it, and the total number of read operations to copies on lower layers in the copy tree. Also its data reuse-factor can be calculated. From this tree other valid copy trees can be derived because it is allowed to copy data from any ancestor node in the tree, not only the parent node. Therefore, in the method according to the present invention it is proposed to extend the copy-candidate tree to a copy-candidate graph in the following way: For every node in the tree, edges are added starting from all its ancestor nodes towards the node itself. All possible trees that can be derived by selecting a single path from the root node to every leaf node, represents a valid copy tree.

In the method according to the invention constructing from said copy-candidate tree a copy-candidate graph comprises the steps of drawing for each node of said copy-candidate tree edges towards essentially all its descendent nodes and weighting each of said edges with a weight factor, whereby said weight factor being an estimate of the amount of data-transfer between the nodes connected by said edge. Further in said method according to the invention constructing from said copy-candidate graph a copy-candidate reuse set comprises the steps of selecting at least one path from said root node of said copy-candidate graph to one of its leaf nodes, whereby each selected path being an element of said copy-candidate reuse set.

In an embodiment the array copy tree is the tree obtained this way with lowest cost. Said array copy tree represents an optimized memory organization for the digital device under consideration for said array signal. Selecting the array copy tree from all possible copy trees is called data reuse decision. The cost function or evaluation criterion used for selecting the array copy tree is defined further. In another embodiment of the invention a plurality of array copy trees are retained. These array copy trees with an evaluation criterion below a certain threshold are kept. Further selection between said array copy trees or even creation of other memory configuration from said array copy trees is performed during subsequent design steps of said digital device.

In a fourth step (22) for at least one of said copy-candidate graphs, a copy-candidate reuse set (17)(31) is constructed. Each element in said set represents a possible memory hierarchy or memory organization.

In a fifth and last step (23) at least one element is selected from the copy-candidate reuse tree associated with said array signal and said selected element is placed in an optimal data reuse set (18). The element of said optimal data reuse set define said optimized memory organization of said digital device. In an embodiment said selection and placing of an element of a copy-candidate reuse tree is done after calculating for each element of said copy-candidate reuse sets an evaluation criterion. Then for each of said copy-candidate reuse sets, the element with the lowest evaluation criterion is placed in an optimal data reuse set (18) whereby said elements in said optimal data reuse set represent said optimized memory organization of said digital system. In an embodiment of the invention said evaluation criterion can be an estimate of the power consumption of said digital device when said digital system would have the memory organization as represented by said element in said copy-candidate reuse set. In another embodiment in said evaluation criterion also an estimate of the total memory area of such a memory organization can be taken into account.

In an embodiment of the invention the evaluation criterion for selecting the optimal copy tree is a weighted sum of a power and area estimate for the copy tree or data reuse tree. The cost function is given by Formula 2 with c being a copy-candidate of the considered copy tree CT, $P_r/w(N_{bits}, N_{words}, f_{access})$ being the power estimate for read/write operations of a memory with bit width $N_{bits}$, word depth $N_{words}$, and that is accessed with a real access frequency $f_{access}$, $A(N_{bits}, N_{words})$ is the area estimate for a memory with specified parameters, and alpha and beta are weighting factors for area/power trade-offs. The real access frequency $f_{access}$ of a memory is obtained by multiplying the number of memory accesses per frame with the frame rate of the application and not the clock frequency.

$$\mathrm{cost}(CT) = \alpha \cdot \sum_{c \in CT} [P_r(N_{bits}(c), N_{words}(c), f_{read}(c)) + P_w(N_{bits}(c), N_{words}(c), f_{write}(c))] + \beta \cdot \sum_{c \in CT} A(N_{bits}(c), N_{word}(c)) \quad \text{Formula 2}$$

The end result of the data reuse decision task is an optimal array copy tree for each array in the application. Here, it is assumed that the optimal copy tree can be derived for each array independently from the other arrays. This is in many circumstances an oversimplification because the optimal copy trees depend partly on how well the different copies can share memory space (inter-array in-place [E. De Greef, F. Catthoor, H. De Man, "Memory Size Reduction through Storage Order Optimization for Embedded Parallel Multimedia Applications", International Parallel Processing Symposium (IPPS) in Proceedings Workshop on "Parallel Processing and Multimedia", Geneva, Switzerland, pp.84–98, April 1997.]). However, because the data reuse decision is best taken early in the design flow, not enough data about inter-array in-place is available to include it in the decision process.

The method according to the invention is now illustrated on a motion estimation application, described by code (FIG.

Figure 9:
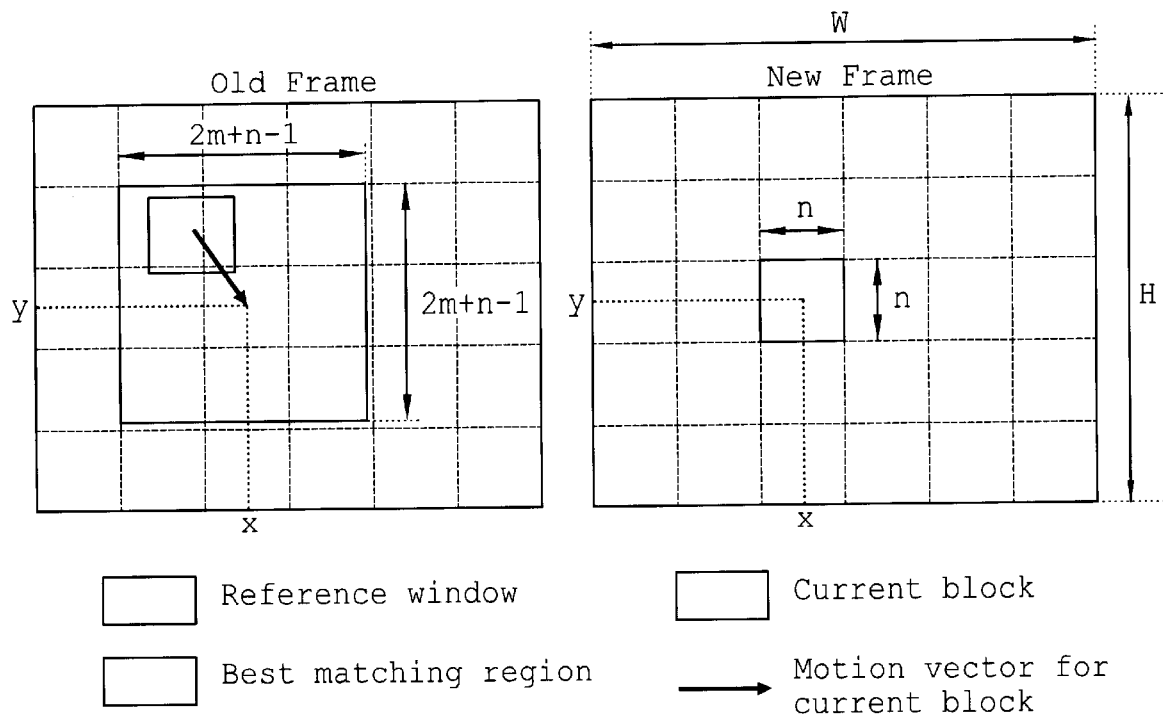
FIG. 9 shows the code of the motion estimation example. There is only one read instruction on the array signals OLD and NEW, being embedded in a loop nest of depth 6.
Figure 10:
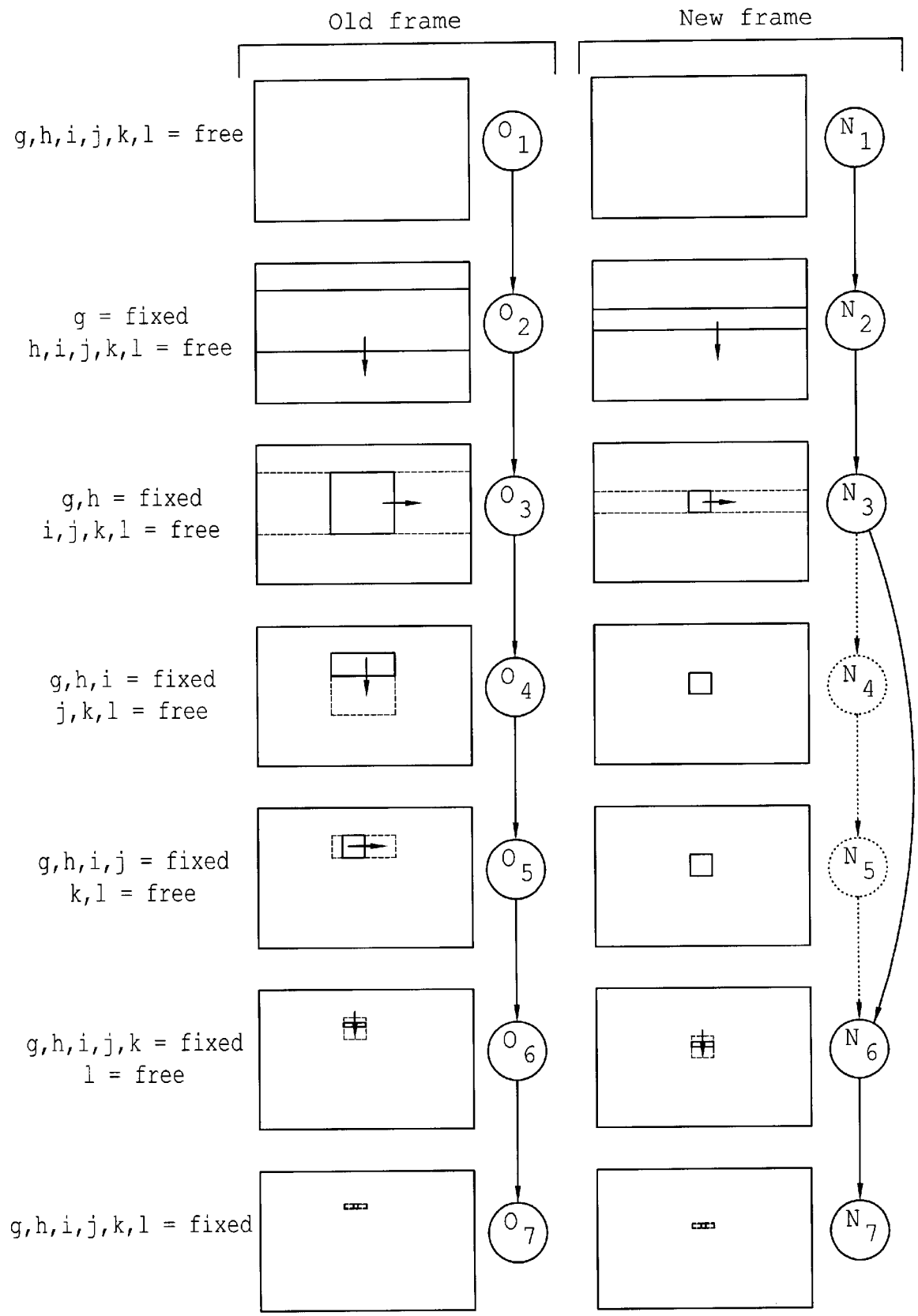
FIG. 10 shows the copy-candidate chains for the two relevant array signals OLD and NEW in the motion estimation example. Said chains are also copy-candidate trees as there is only one read instruction involved here.
Figures 11A, 11B:
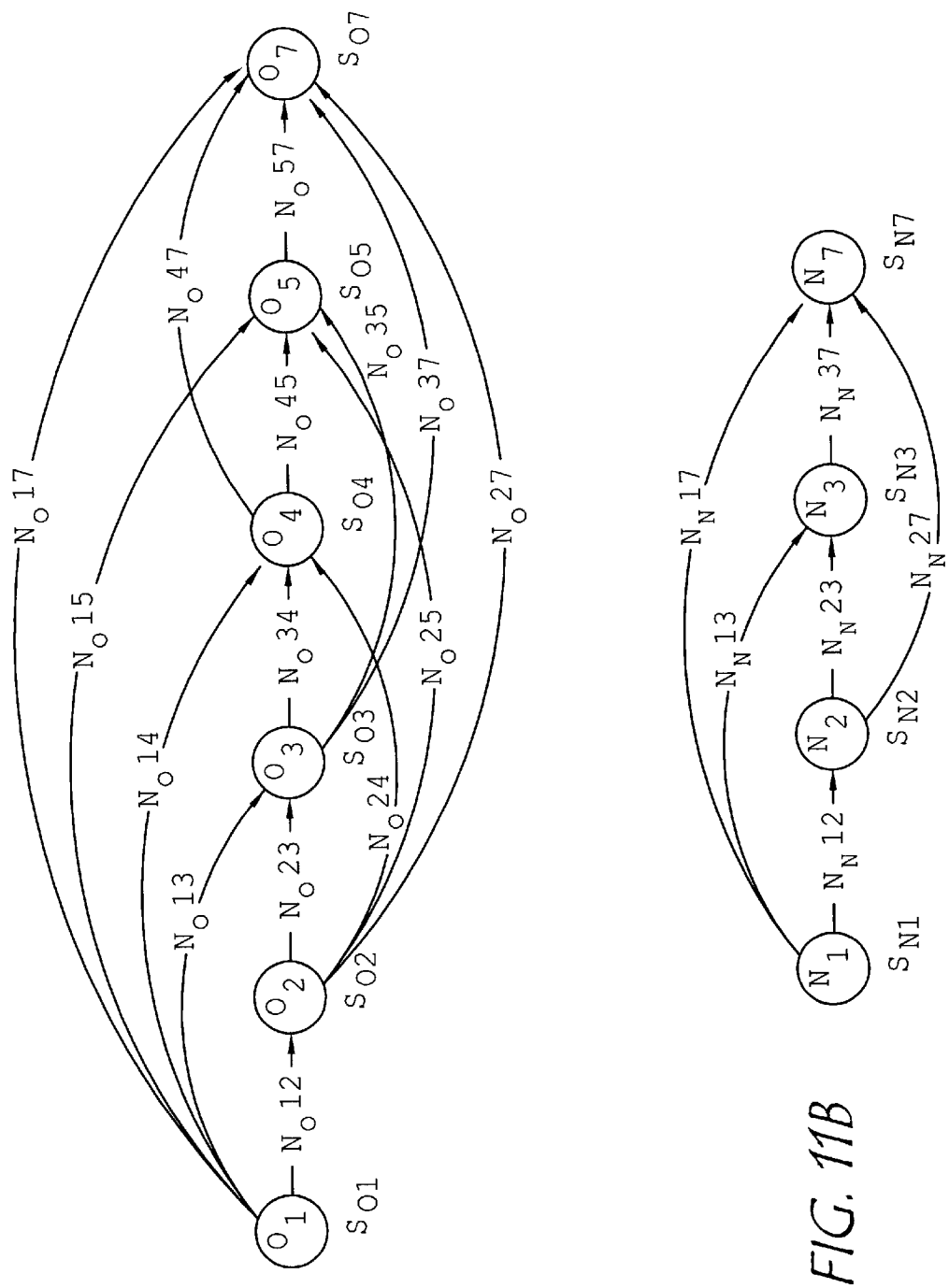
FIG. 11 shows the copy-candidate graph for the two relevant array signals OLD and NEW in the motion estimation example.
Figure 12A:
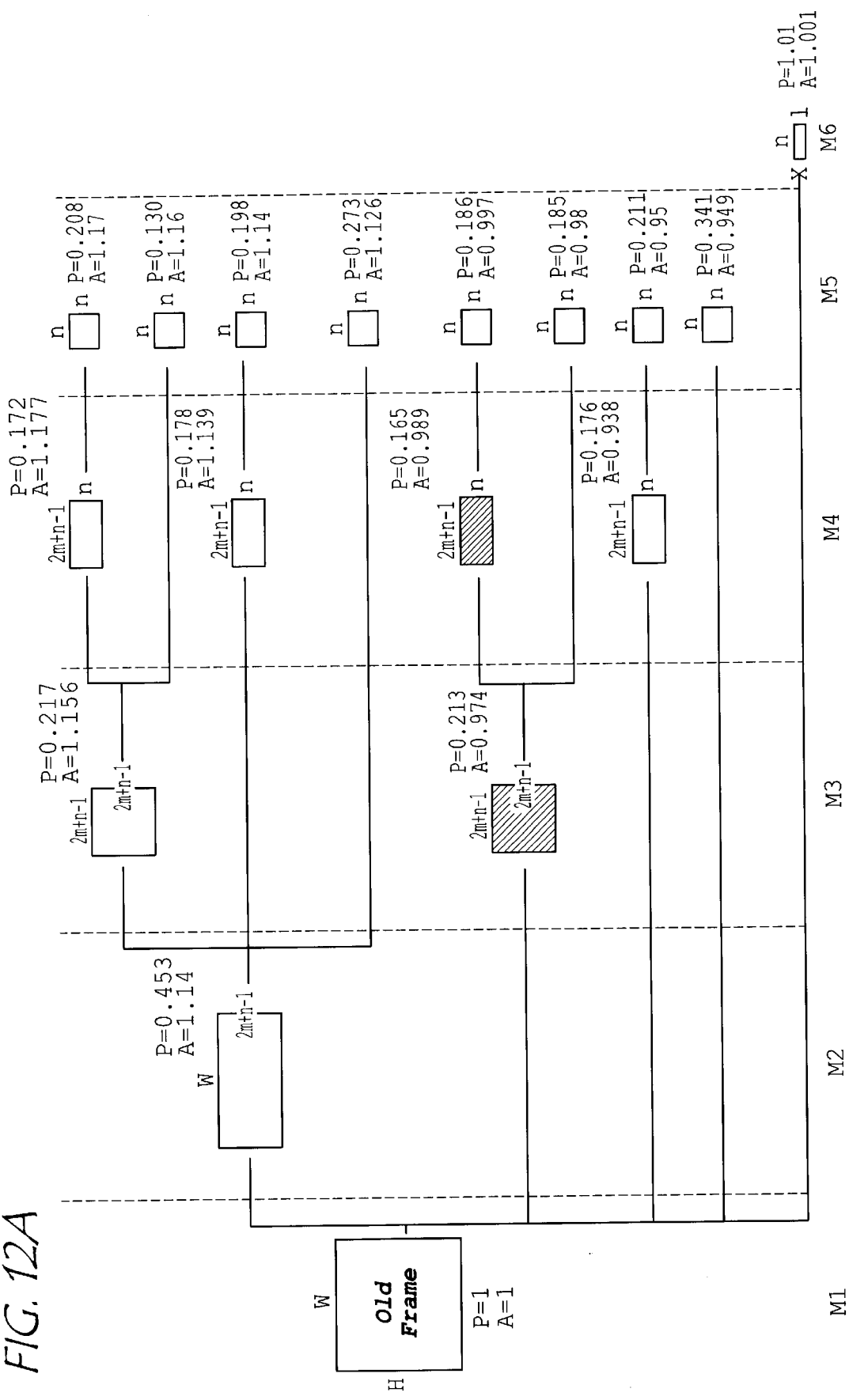
FIGS. 12A and B show alternative representations of the copy-candidate reuse set as a search tree.
Figure 12B:
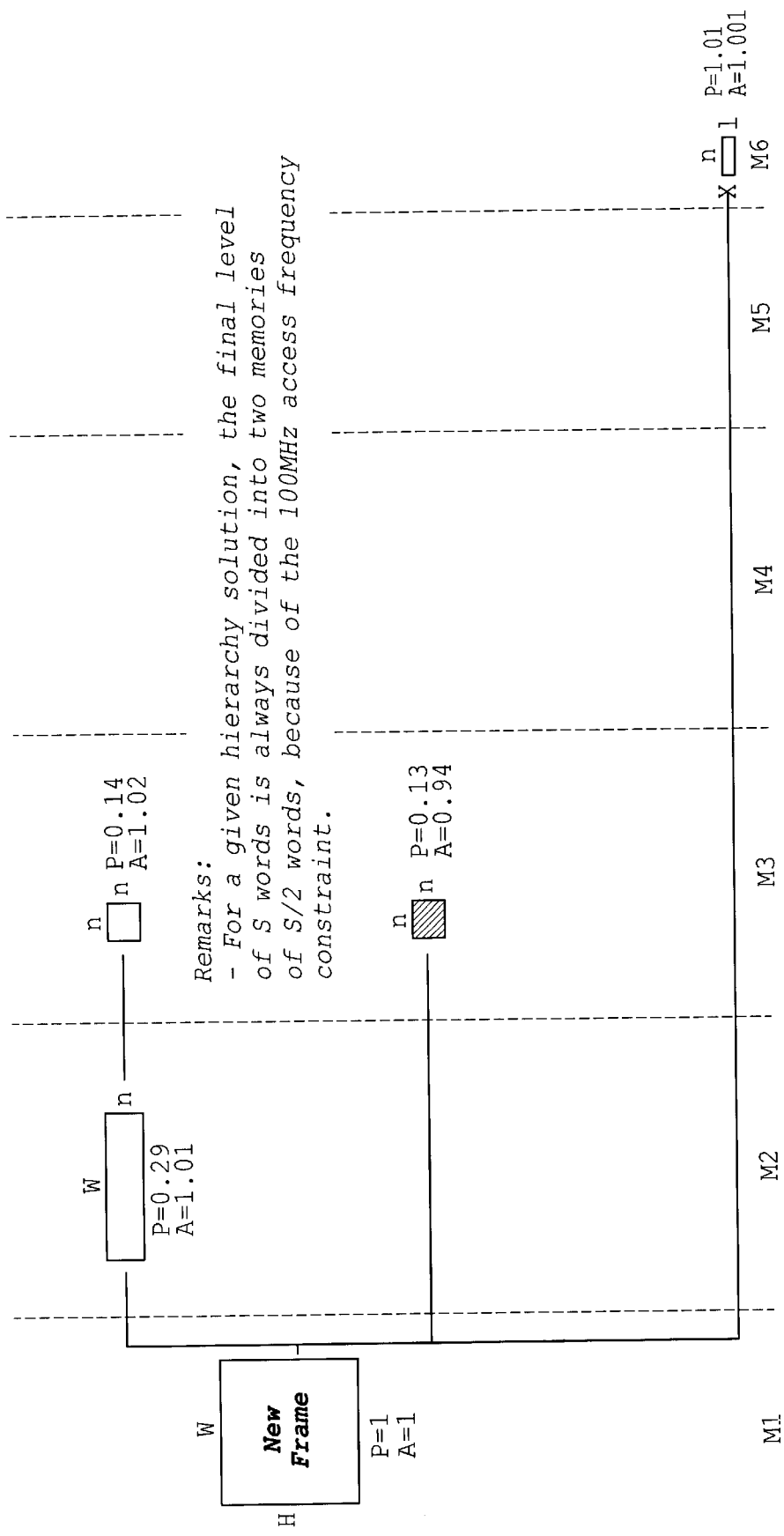

9), describing the functionality of a digital device performing said motion estimation application. The method according to the invention is not limited to said application. In the motion estimation application only two array signals will be considered, thereby illustrating that the array signals taken into account in the method according to the invention can be selected by the designer of said digital system. Other array signals are preferably stored in the foreground registers of the processor in said digital device. In said code (FIG. 9) one recognizes loop constructs around read operations on the array NEW and OLD. Said read instructions are embedded in a loop nest of depth 6. FIG. 10 shows the copy-candidate chains for the two read instructions accessing arrays NEW and OLD respectively. Copy-candidates $N_4$ and $N_5$ can be pruned because they are not smaller than $N_3$. Since there is only one read instruction from the array signals, here representing frames, there is nothing to combine in this example: the copy-candidate chains for the frame arrays are the copy-candidate trees also. The nodes $O_6$ and $N_6$ can now be pruned because they have a reuse ratio of one (i.e. no reuse). The copy-candidate graphs for the two frame arrays are shown in FIG. 11. In this case the copy-candidate trees are in fact chains. In general this is not true. Because of the chains, the search process for finding the array copy tree can be represented as a simple search tree. FIGS. 12A and B show these search trees for the motion estimation example. The (optimal) array copy trees are indicated in hatching. The dashed lines divide the search trees in a number of layers. Each layer corresponds to a copy-candidate (or time-frame level). The solutions can either include this copy-candidate (copy is shown in search tree) or skip it (copy is not shown). Every node in the tree represents a solution: the copy-candidate on that node is the lowest layer in the hierarchy, and all copy-candidates on the path between the root node and the node itself are intermediate layers in the hierarchy. For each solution, the area (A) and power (P) of the complete array copy tree for that solution relative to the solution without hierarchy (root node) are indicated. A surprising result is that the total memory area can decrease by adding extra memory layers. The reason for this is that the maximum access frequency of the memories is taken into account in the estimations. If a certain memory would be accessed above its maximum access frequency, this memory can be split into two memories of half the size to increase the memory bandwidth. This splitting introduces overhead. By adding extra memory layers with small memories, the bandwidth requirements of the large background memories can be reduced, and therefore splitting can be avoided for the large memories. This area gain can be larger than the area lost by adding a few small memories. The optimal memory hierarchy for power is for the Old frame, a 3-level hierarchy that leads to a power saving of 83% compared to the solution without memory hierarchy and for the NEW frame, a 2-level hierarchy that leads to a power saving of 87% compared to the solution without memory hierarchy. These figures do not include the power dissipation in the interconnect. Taking this into account will result in even larger gains, as off-chip communication dissipates much more power than on-chip communication. Without memory hierarchy all data transfers are off-chip. With memory hierarchy, most of these are replaced by less power consuming on-chip transfers. The large power gains obtainable by introducing an optimized memory hierarchy justify that the memory hierarchy should be decided early in the design flow.

The methods in accordance with the present invention described above may be implemented on a suitable computer or workstation including a suitable display, e.g. a VDU and/or a printer or plotter. The input data for the workstation is a functional description in a suitable language of the application to be run on a digital device. The present invention includes an automated design system for determining an optimized memory organization of an essentially digital device represented by a code describing the functionality of said digital device, the code comprising read instructions on array signals. The workstation runs software for determining for at least one array signal and for at least one read instruction on said array signal a hierarchical chain with a plurality of reusable data groupings; for evaluating for combinations of said reusable data groupings an evaluation criterion; for selecting the combination of said reusable data groupings with the optimal and/or lowest value of the evaluation criterion; and for outputting said optimized memory organization determined from said selected combination of said reusable data groupings. The evaluation criterion may be power consumption. The workstation may also evaluate combinations in accordance with a further evaluation criterion, e.g. memory size, and the selection may be made in accordance with a combination of both the evaluation and the further evaluation criteria. The system includes determining the actual physical memories of the digital device in accordance with or in dependence upon the output of workstation. In an embodiment of the invention said steps are performed for all array signals in said code, describing the functionality of said essentially digital device, selected by the designer of said digital device.

The workstation may carry out the five main steps (19, FIG. 2), (20), (21), (22), (23), i.e. copy-candidate chain construction, copy-candidate tree construction, copy-candidate graph construction, copy-candidate reuse set construction and finally selection, respectively. The workstation explores data reuse possibilities and does that by evaluating the effect on power consumption and/or memory size of considering reusable data groupings.

The workstation carries out the analysis for essentially each array signal in said code separately and performs this analysis for at least one array signal. Naturally, some array signals can be excluded when the designer thinks that this array signal will not significantly contribute to the power consumption of said digital device. The designer may interact with the workstation via conventional input means such as a keyboard to select array signals. All the considered array signals can be represented in a set (11, FIG. 2). All the read instructions on one array signal can be represented as a subset (12) of 30 the set of all read operations on array signals (11) in said code.

In a first step (19), the workstation constructs a copy-candidate chain (33, FIG. 3) for each read instruction in said code on the array signal under consideration. This results in a set of copy-candidate chains (13, FIG. 2). Said copy-candidate chains can be grouped in a set (15) of copy-candidate chains associated with a particular array signal. Said copy-candidate chain can be denoted as a hierarchical chain of reusable data groupings.

In a second step (20, FIG. 2), the workstation constructs from at least part of said copy-candidate chains a copy-candidate tree (26). In such a copy-candidate tree at least the root node of said copy-candidate tree is equal to the root node of said part of copy-candidate chains, which are equal by construction. The copy-candidate tree at least comprises of a subset of the copy-candidates of said part of said copy-candidate chains. Said copy-candidate trees define a copy-candidate tree set (15). Note that for copy-candidate tree construction at least one copy-candidate chain is necessary. Not all copy-candidate chains of an array signal are however involved. Indeed read instructions on an array signal can be grouped. For each group, a copy-candidate tree can be constructed.

Figure 3:
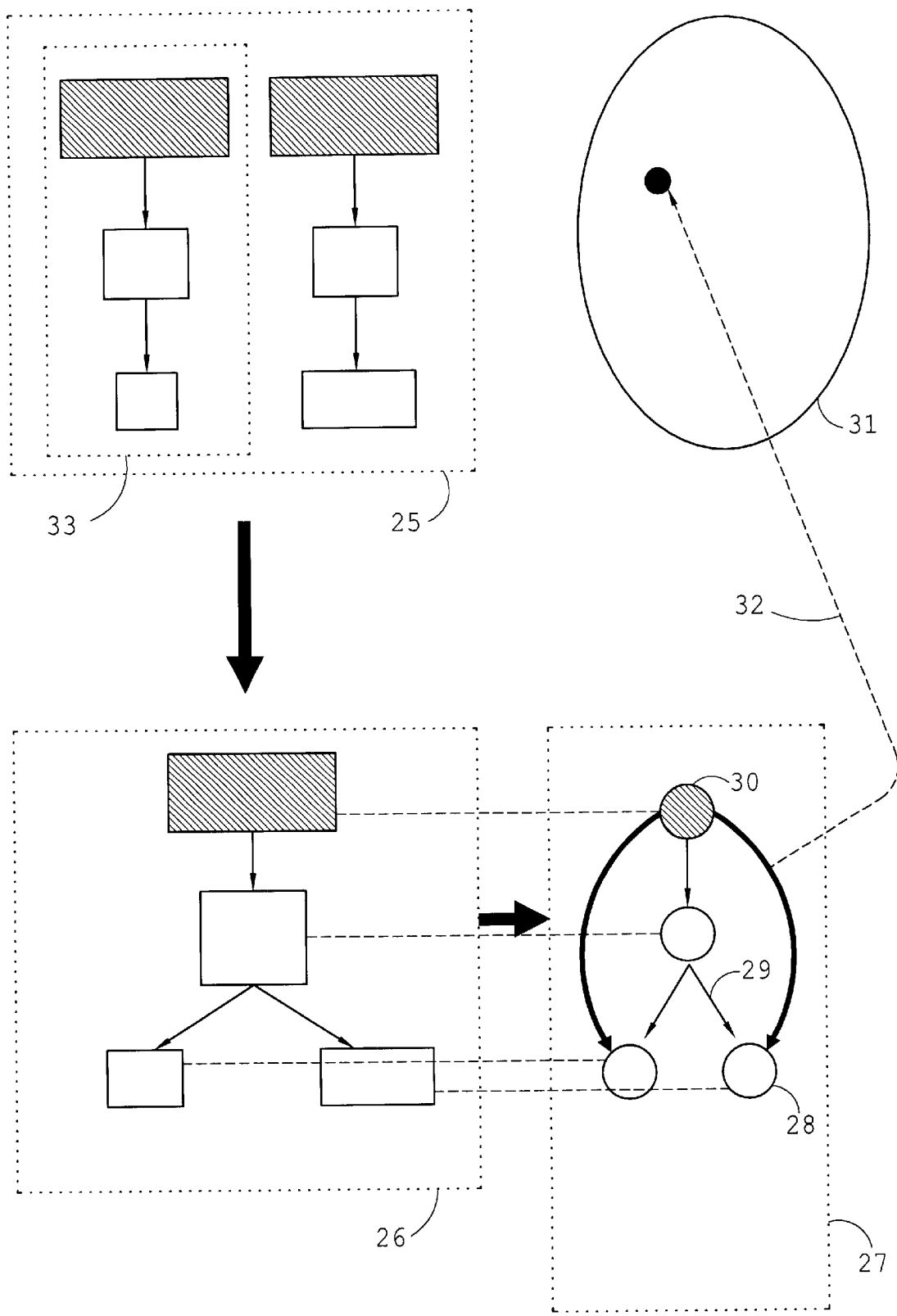
FIG. 3 shows a set (25) of copy-candidate chains, for instance comprising copy-candidate chain (33). From said copy-candidate chain set (25) a copy-candidate tree (26) is constructed. Said copy-candidate tree comprises at least one of the copy-candidates/memories of the copy-candidate chains. Copy-candidates containing essentially the same data are preferably shared. Further from said copy-candidate tree (26) a copy-candidate graph (27) is constructed. Each node represents one of the copy-candidates. Edges (29) are drawn to each node from its ancestor nodes. On each edge a weighting factor is attached. Said weighting factor denotes the data transfer to or from a node. The root node (30) represents the main memory. The lowest nodes are denoted also leaf nodes. One path in said copy-candidate graph (indicated with fat edges) defines an element of the copy-candidate reuse set (31), from which further an optimal one will be selected.
Figure 4:
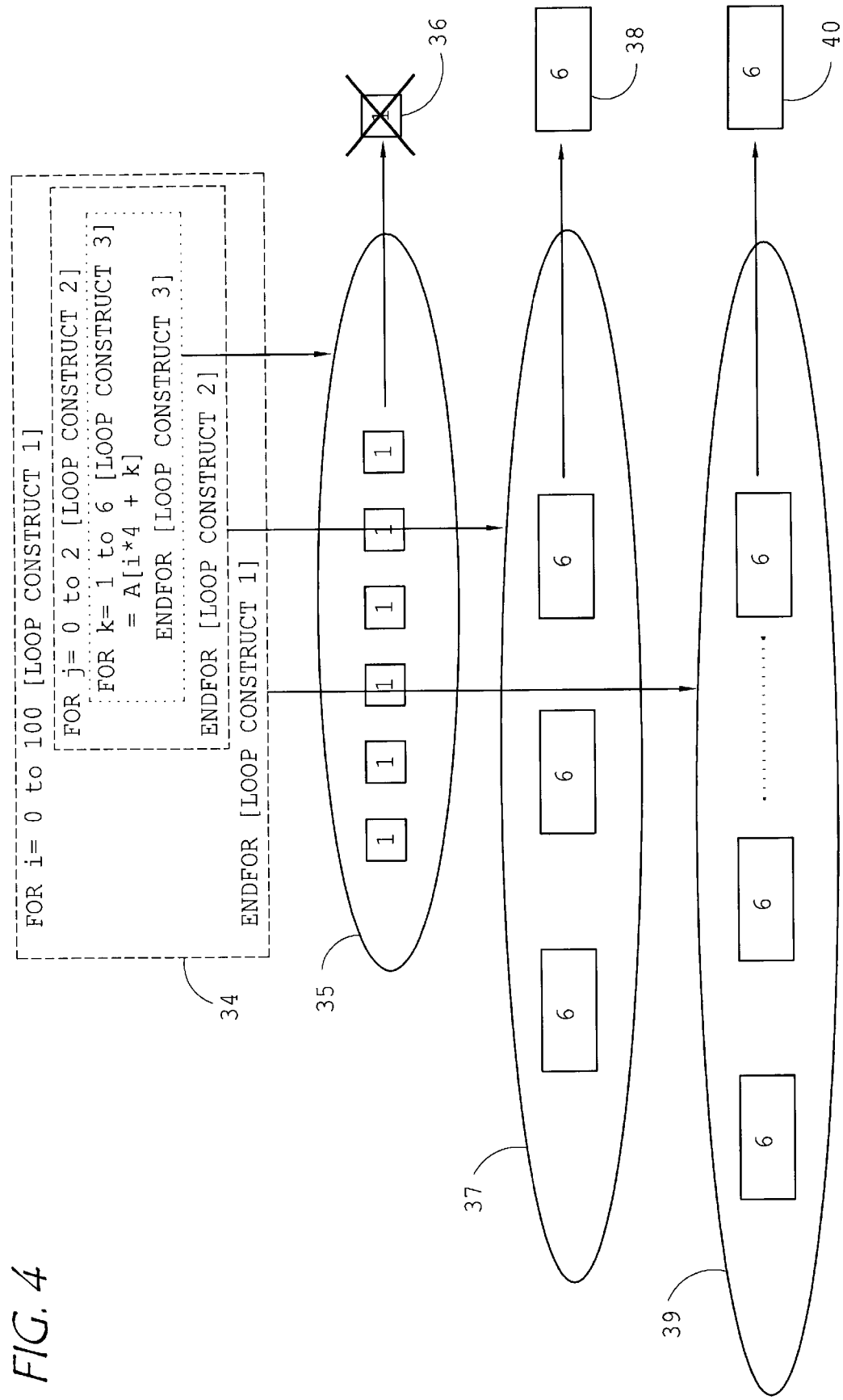
FIG. 4 shows a piece of code (34) with three loop constructs from which copy-candidates will be determined. Said copy-candidates are then used for defining a copy-candidate chain. Memory sizes found during iteration of loop construct 3 are indicated (35). Said memory size (36) is implicitly rejected as it is of size one. Memory sizes found during iteration of loop construct 2 are indicated (37). The maximal memory size defines a copy-candidate (38), which will be incorporated in a copy-candidate chain. Memory sizes found during iteration of loop construct 1 are indicated by (39). As the maximal memory size (40) equals the size of the copy-candidate found for an inner loop construct, said size (38) is not selected as a new copy-candidate for the data reuse chain.

In a third step (21), the workstation constructs for at least one of said copy-candidate trees a copy-candidate graph (27, FIG. 3). Such a graph comprises of nodes (28), (30) representing memories/copy-candidates and edges (29), representing data-transfers between said memories/copy-candidates. The graph may be displayed on a VDU or printed out. For each grouped set of read instructions on an array signal a copy-candidate graph, being part of the copy-candidate graph set (16), can be constructed and displayed.

In a fourth step (22), the workstation constructs for at least one of said copy-candidate graphs a copy-candidate reuse set (17), (31). Each element in said set represents a possible memory hierarchy. Such an element of said copy-candidate reuse set can also be denoted to be a combination of data reusable groupings. Indeed such a combination can be represented by nodes and their interconnecting edges.

In a fifth and last step (23), the workstation selects for at least one group of read instructions on an array signal one element from the copy-candidate reuse set, associated with said group of read instructions on said array signal and said selected element is placed in an optimal copy-candidate reuse set (18). The elements of said optimal copy-candidate reuse set define said optimized memory organization of said digital device for a group of read instructions on an array signal. The elements may be displayed or printed out.

Note that said copy-candidate chain, copy-candidate, copy-candidate graph, copy-candidate reuse set all represent data reuse possibilities. Said copy-candidate chain can equivalently be denoted as a hierarchical chain of reusable data groupings. Said combination of reusable data groupings is an element of the copy-candidate reuse set and can be constructed from said copy-candidate graph.

In an embodiment of the invention said steps are performed by the workstation for all array signals in said code, describing the functionality of said essentially digital device, selected by the designer of said digital device.

In an embodiment of the invention copy-candidate graphs are constructed by the workstation from all copy-candidate chains on an array signal, meaning that thus all read instructions of said array signal are grouped in one set. This results in one copy-candidate reuse set for said array signal. The optimal element selected from said copy-candidate reuse set represents then an optimized memory organization of said digital device for said array signal and may be displayed and printed out.

In an embodiment said selection and placing of an element of a copy-candidate reuse tree is done by the workstation after the workstation calculates for essentially all elements of said copy-candidate reuse sets an evaluation criterion. Then for each of said copy-candidate reuse sets, the element with the best evaluation criterion is placed in an optimal copy-candidate reuse set (18) by the workstation whereby said elements in said optimal copy-candidate reuse set represent said optimized memory organization of said digital device.

In an embodiment of the invention said evaluation criterion can be an estimate of the power consumption of said digital device when said digital device would have the memory organization as represented by said element in said copy-candidate reuse set. In an embodiment, said evaluation criterion, besides power consumption, estimates the total memory area of such a memory organization can be taken into account by the workstation.

In summary one aspect of the present invention can be formalized as being a method for determining an optimized memory organization of an essentially digital device, comprising the steps of loading code describing the functionality of said digital system; said code essentially comprising read instructions on array signals; determining for at least one array signal and for at least one read instruction on said array signal a plurality of data reuse possibilities from said code and selecting one of said data reuse possibilities; and determining from said selected data reuse possibilities said optimized memory organization.

The method recited above may be further characterized in that said determining for at least one array signal and for at least one read instruction on said array signal a plurality of data reuse possibilities from said code and selecting one of said data reuse possibilities comprises the steps of: constructing a copy-candidate chain; constructing from said copy-candidate chains copy-candidate tree; constructing from said copy-candidate tree a copy-candidate graph; constructing from said copy-candidate graph a copy-candidate reuse set, the elements of said copy-candidate reuse set representing data reuse possibilities; selecting one of said data reuse possibilities by placing one of the elements of said copy-candidate reuse set in an optimal data reuse set.

The method recited above wherein said determining from said selected data reuse possibilities said optimized memory organization comprises representing said optimized memory organization by said element in said optimal data reuse set.

A method according to the invention can also be formulated as stated below. The notion of copy-candidate or data reuse possibility is denoted now to be a reusable data grouping. Said constructing of copy-candidate chains, trees, graphs and sets is being described by determining a hierarchical chain of reusable data groupings with a further evaluation and selection step on combinations of said reusable data groupings. A combination of said reusable data groupings can be determined from a copy-candidate graph and can be represented as a particular selection of nodes and edges of such a graph.

A method for determining an optimized memory organization of an essentially digital device in accordance with the present invention may comprise the steps of: loading code describing the functionality of said digital system; said code comprising read instructions on array signals; determining for at least one array signal and for at least one read instruction on said array signal a hierarchical chain with a plurality of reusable data groupings; evaluating for combinations of said reusable data groupings an evaluation criterion; selecting the combination of said reusable data groupings with the optimal/lowest evaluation criterion; determining from said selected combination of said reusable data groupings said optimized memory organization.

In order to decrease the complexity of the exploration of said combinations of said reusable data groupings involved in the evaluating and selecting step an array-by-array approach can be preferred but not necessary. The reusable data groupings are associated with loop constructs, found in the code, describing the functionality of said digital system. A hierarchical chain (or copy-candidate chain) is found due to nested loop nests.

A method in accordance with the present invention for determining an optimized memory organization of an essentially digital device, may also comprise the steps of: loading code describing the functionality of said digital system; said code essentially comprising read instructions on array signals; constructing for at least one array signal and for at least one read instruction on said array signal a copy-candidate chain; constructing from said copy-candidate chains copy-candidate tree; constructing from said copy-candidate tree a copy-candidate graph; constructing from said copy-candidate graph a copy-candidate reuse set; placing one of the elements of said copy-candidate reuse set in an optimal data reuse set; and said elements in said optimal data reuse set represent said optimized memory organization of said digital system. This method may include said placing one of the elements of said data reuse set in an optimal data reuse set comprising the steps: calculating for each element of said copy-candidate reuse set an evaluation criterion; and placing the element with the lowest evaluation criterion in said optimal data reuse set. The evaluation criterion of said elements of said copy-candidate reuse set may at least be an estimate of the power consumption of said digital device with a memory organization, represented by said element. Evaluation criteria of said elements of said copy-candidate reuse set may comprise at least an estimate of the power consumption of said digital device with a memory organization, represented by said element, and an estimate of the memory area of said memory organization, represented by said element.

The method recited above may also include constructing a copy-candidate chain for a read instruction on an array signal comprising the steps: determining copy-candidates for a read instruction on an array signal; ordering by size said copy-candidates in a copy-candidate chain, whereby each numbered node in the chain represents a copy-candidate, the number denoting the size of the copy-candidate and the root node being a copy-candidate with the size of said array signal. In this method said code further comprises loop constructs; and the determination of copy-candidates for a read instruction on an array signal comprises the steps of: putting for each loop construct in which said read instruction on said array signal is embedded and for each iteration of said loop construct the size of the data accessed by said read instruction on said array signal in a copy-candidate set; defining said copy-candidate as a memory with its size equal to the maximum size found in said copy-candidate set.

The method may also include constructing from said copy-candidate chains a copy-candidate tree comprises at least identifying as root node of said copy-candidate tree the root node of said copy-candidate chains. This method may also include constructing from said copy-candidate chains a copy-candidate tree further comprises at least sharing nodes of said copy-candidate chains when copy-candidates associated with said notes contain essentially the same data. This method may also include constructing from said copy-candidate chains a copy-candidate tree further comprising determining the data reuse factor of said copy-candidates and omitting from said copy-candidate tree said copy-candidates with a data reuse factor smaller than or equal to a threshold value. The threshold value may be one.

The method may also include constructing from said copy-candidate chains a copy-candidate tree comprising at least identifying as root node of said copy-candidate tree the root node of said copy-candidate chains. This method may also include constructing from said copy-candidate chains a copy-candidate tree. The method comprises sharing nodes of said copy-candidate chains when copy-candidates associated with said nodes contain essentially the same data. This method may also include constructing from said copy-candidate chains a copy-candidate tree further comprising determining the data reuse factor of said copy-candidates and omitting from said copy-candidate tree said copy-candidates with a data reuse factor smaller than or equal to a threshold value. The threshold value may be one.

In this method recited the determination of the reading power contribution of each copy-candidate of said element comprises multiplying the power needed for reading to said copy-candidate, said power being determined by the size of said copy-candidate, with the amount of data-transfer to said copy-candidate, being determined by the weight factor of the corresponding edge in said copy-candidate graph. The determination of the writing power contribution of each copy-candidate of said element, may comprise multiplying the power needed for writing from said copy-candidate, said power being determined by the size of said copy-candidate, with the amount of data-transfer from said copy-candidate, being determined by the weight factor of the corresponding edge in said copy-candidate graph.

The present invention may include an apparatus for determining an optimized memory organization of an essentially digital device, comprising: means for inputting code describing the functionality of said digital system, said code essentially comprising read instructions on array signals; means for constructing for at least one array signal and for at least one read instruction on said array signal a copy-candidate chain, means for constructing from said copy-candidate chains copy-candidate tree; means for constructing from said copy-candidate tree a copy-candidate graph; means for constructing from said copy-candidate graph a copy-candidate reuse set; means for placing one of the elements of said copy-candidate reuse set in an optimal data reuse set; and means for outputting said optimized memory organization being represented by said elements in said optimal data reuse set.

The present invention may also include an apparatus adapted for determining an optimized memory organization of an essentially digital device, comprising means for inputting code describing the functionality of said digital system, said code essentially comprising read instructions on array signals; means for determining for at least one array signal and for at least one read instruction on said array signal a plurality of data reuse possibilities from said code and selecting one of said data reuse possibilities; means for determining from said selected data reuse possibilities said optimized memory organization and means for outputting said optimized memory organization.

It will be apparent to the skilled person that alterations and amendments can be made to the present invention in an obvious manner, the spirit and the scope of the present invention only being limited by the attached claims.

What is claimed is:

1. A method of determining an optimized memory organization of an essentially digital device, comprising:

loading code describing the functionality of said essentially digital device, wherein said code comprises read instructions on array signals;

determining for at least one array signal and for at least one read instruction on said array signal a hierarchical chain having a plurality of reusable data groupings;

evaluating, for combinations of said reusable data groupings, an evaluation criterion;

selecting the combination of said reusable data groupings with the optimal and/or the lowest evaluation criterion; and determining from said selected combination of said reusable data groupings said optimized memory organization.

2. The method of claim 1, wherein said evaluating and selecting steps being performed on an array-by-array basis.

3. The method of claim 1, wherein said code further comprises loop constructs, and said reusable data groupings are determined from said loop constructs.

4. The method of claim 1, wherein said evaluation criterion of a combination of reusable data groupings at least comprises an estimate of the power consumption of said essentially digital device with a memory organization, determined from said combination of reusable data groupings.

5. The method of claim 1, wherein said evaluation criterion of a combination of reusable data groupings at least comprises an estimate of the power consumption of said essentially digital device with a memory organization, determined by said combination of reusable data groupings, and an estimate of the memory area of said memo organization.

6. The method of claim 1, wherein reusable data groupings with a data reuse factor smaller than or equal to a threshold value are omitted.

7. The method of claim 6, wherein said threshold value is one.

8. The method of claim 1, wherein
evaluating for combinations of said reusable data groupings an evaluation criterion comprising:
determining the amount of data-transfers between said reusable data groupings of said combination; and
determining the reading and writing power contribution of each reusable data grouping of said combination.

9. The method of claim 1, additionally comprising determining the physical memories of the essentially digital device in accordance or in dependence upon the output of the determining said optimized memory organization.

10. An automated design system for determining an optimized memory organization of an essentially digital device represented by a code describing the functionality of said digital device, the code comprising read instructions on array signals, the design system comprising:
a first computing device capable of determining for at least one array signal and for at least one read instruction on said array signal a hierarchical chain with a plurality of reusable data groupings;
a second computing device, capable of evaluating for combinations of said reusable data groupings, an evaluation criterion;
a third computing device capable of selecting the combination of said reusable data groupings with the optimal and/or lowest value of the evaluation criterion; and
a fourth computing device capable of outputting said optimized memory organization determined from said selected combination of said reusable data groupings.

11. The system of claim 10, wherein the first to fourth computing devices together form a computer.

12. The system of claim 10, wherein said second and third computing devices are adapted to perform evaluation and selection, respectively, on an array-by-array basis.

13. The system of claim 10, wherein said code further comprises loop constructs, and wherein said first computing device is adapted to determine the reusable data groupings from said loop constructs.

14. The system of claim 10, wherein said evaluation criterion of a combination of reusable data groupings at least comprises an estimate of the power consumption of said essentially digital device with a memory organization, determined from said combination of reusable data groupings.

15. The system of claim 10, wherein said evaluation criterion of a combination of reusable data groupings at least comprises an estimate of the power consumption of said essentially digital device with a memory organization, determined by said combination of reusable data groupings, and an estimate of the memory area of said memory organization.

16. The system of claim 10, wherein reusable data groupings with a data reuse factor smaller than or equal to a threshold value are omitted.

17. The system of claim 16, wherein said threshold value is one.

18. The system of claim 10, wherein the second computing device is adapted to:
determine the amount of data-transfers between said reusable data groupings of said combination; and
determine the reading and writing power contribution of each reusable data grouping of said combination.

* * * * *